(12) United States Patent
Fujishiro et al.

(10) Patent No.: US 12,713,251 B2
(45) Date of Patent: Aug. 18, 2026

(54) COMMUNICATION CONTROL METHOD, WIRELESS TERMINAL, AND BASE STATION

(71) Applicant: KYOCERA Corporation, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 311 days.

(21) Appl. No.: 18/406,090

(22) Filed: Jan. 6, 2024

(65) Prior Publication Data

US 2024/0155379 A1 May 9, 2024

Related U.S. Application Data

(63) Continuation of application No. PCT/JP2022/026683, filed on Jul. 5, 2022.

(30) Foreign Application Priority Data

Jul. 8, 2021 (JP) ................................ 2021-113804

(51) Int. Cl.

*H04W 24/02* (2009.01)
*H04W 16/28* (2009.01)
*H04W 76/10* (2018.01)
*H04W 76/20* (2018.01)

(52) U.S. Cl.

CPC ........... *H04W 24/02* (2013.01); *H04W 16/28* (2013.01); *H04W 76/10* (2018.02); *H04W 76/20* (2018.02)

(58) Field of Classification Search

CPC ..... H04W 24/02; H04W 16/28; H04W 76/10; H04W 76/20; H04W 16/26

See application file for complete search history.

(56) References Cited

U.S. PATENT DOCUMENTS

| | | | | |
|---|---|---|---|---|
| 2022/0053433 | A1* | 2/2022 | Abedini | H04L 5/0023 |
| 2022/0321199 | A1* | 10/2022 | Abedini | H04L 41/0813 |
| 2022/0417989 | A1* | 12/2022 | Luo | H04B 7/15535 |

OTHER PUBLICATIONS

Qualcomm; "NR Smart Repeaters"; 3GPP TSG RAN Rel-18 workshop; RWS-210019; Electronic Meeting; Jun. 28, 2021-Jul. 2, 2021; pp. 1-15.

LG U+; "5G eMBBEvolution to 5G-Advanced"; 3GPP Rel-18 Workshop; RWS-210275; Electronic Meeting; Jun. 28-Jul. 2, 2021; pp. 1-8.

Rakuten; "Email discussion summary for [RAN-R18-WS-non-eMBB-Rakuten]"; 3GPP TSG RAN Rel-18 workshop; RWS-210591; Electronic Meeting; Jun. 28-Jul. 2, 2021; pp. 1-21.

* cited by examiner

*Primary Examiner* — Chae S Lee

(74) *Attorney, Agent, or Firm* — Studebaker Brackett PLLC

(57) ABSTRACT

According to an embodiment, a communication control method includes: establishing, by a smart repeater (SR) wireless terminal capable of beamforming, a wireless connection to a base station, the SR wireless terminal controlling an SR device relaying wireless communication between the base station and a wireless terminal; and transmitting, by the base station, one or more SR control configurations used to control the SR device to the SR wireless terminal through wireless communication.

13 Claims, 17 Drawing Sheets

SR CONTROL CONFIGURATION

| | | | |
|---|---|---|---|
| FREQUENCY CONFIGURATION INFORMATION | MODE CONFIGURATION INFORMATION | BEAM CONFIGURATION INFORMATION | AMPLIFICATION DEGREE CONFIGURATION INFORMATION |
| FREQUENCY CONFIGURATION INFORMATION | MODE CONFIGURATION INFORMATION | BEAM CONFIGURATION INFORMATION | AMPLIFICATION DEGREE CONFIGURATION INFORMATION |

⋮

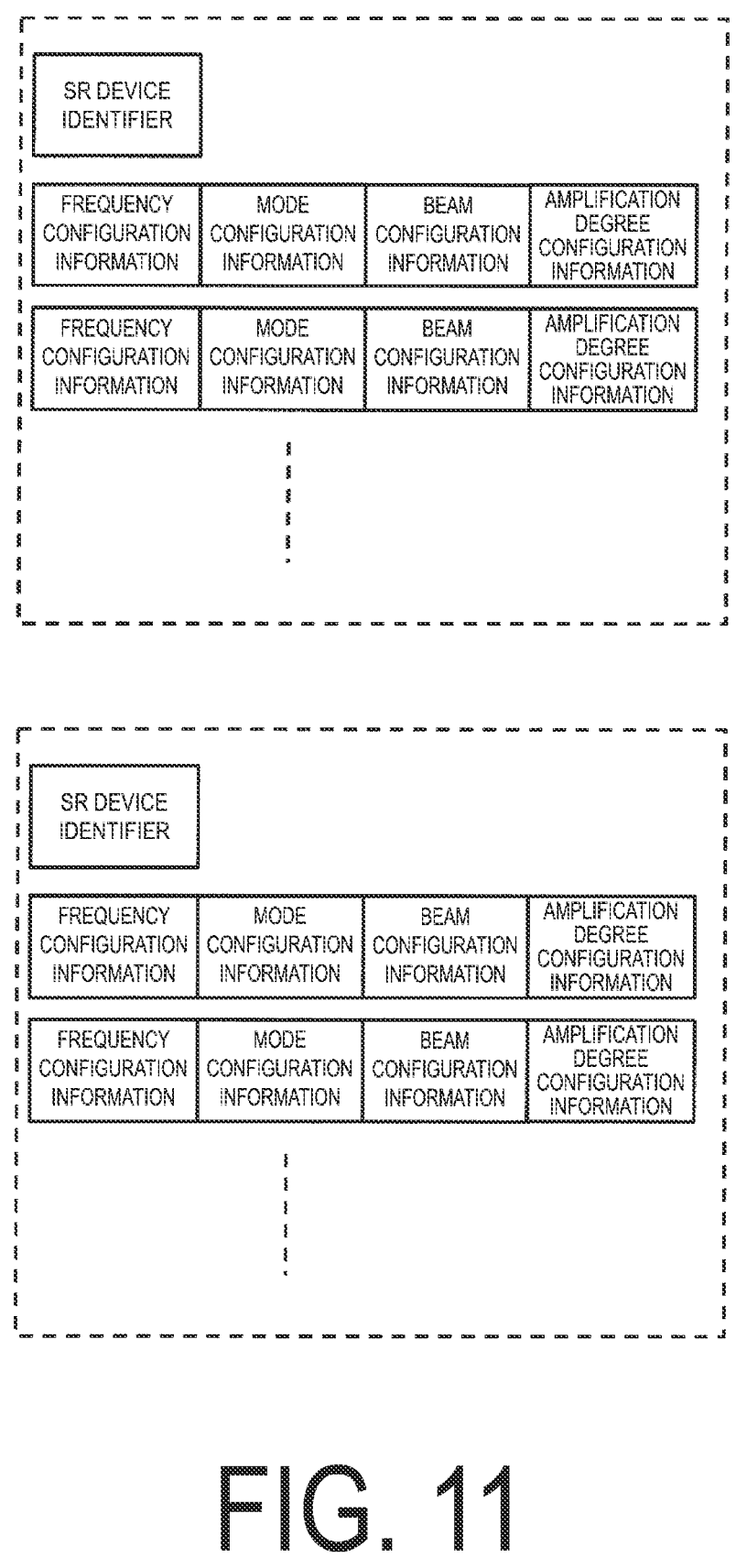

SR DEVICE IDENTIFIER

| FREQUENCY CONFIGURATION INFORMATION | MODE CONFIGURATION INFORMATION | BEAM CONFIGURATION INFORMATION | AMPLIFICATION DEGREE CONFIGURATION INFORMATION |
|---|---|---|---|
| FREQUENCY CONFIGURATION INFORMATION | MODE CONFIGURATION INFORMATION | BEAM CONFIGURATION INFORMATION | AMPLIFICATION DEGREE CONFIGURATION INFORMATION |

SR DEVICE IDENTIFIER

| FREQUENCY CONFIGURATION INFORMATION | MODE CONFIGURATION INFORMATION | BEAM CONFIGURATION INFORMATION | AMPLIFICATION DEGREE CONFIGURATION INFORMATION |
|---|---|---|---|
| FREQUENCY CONFIGURATION INFORMATION | MODE CONFIGURATION INFORMATION | BEAM CONFIGURATION INFORMATION | AMPLIFICATION DEGREE CONFIGURATION INFORMATION |

FIG. 11

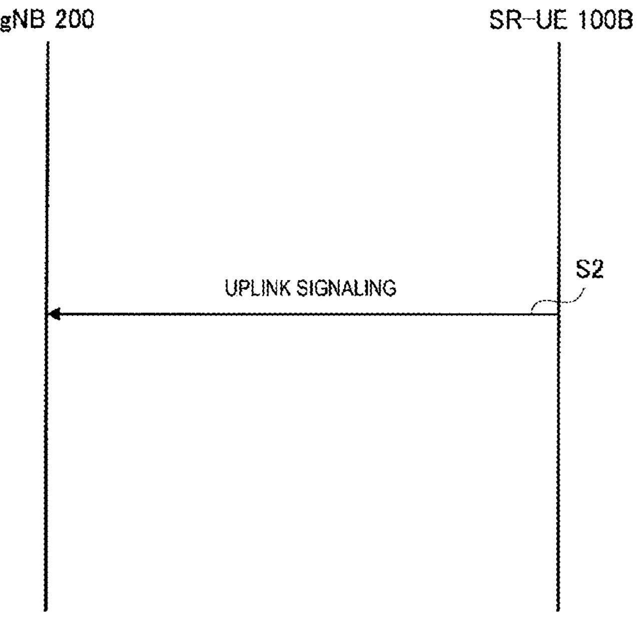

FIG. 12

SR DEVICE CAPABILITY INFORMATION

| SUPPORTED FREQUENCY INFORMATION | MODE CAPABILITY INFORMATION | BEAM CAPABILITY INFORMATION | CONTROL DELAY INFORMATION | AMPLIFICATION CHARACTERISTIC INFORMATION | POSITION INFORMATION | ANTENNA INFORMATION |
|---|---|---|---|---|---|---|

FIG. 13

| SR DEVICE IDENTIFIER | SUPPORTED FREQUENCY INFORMATION | MODE CAPABILITY INFORMATION | BEAM CAPABILITY INFORMATION | CONTROL DELAY INFORMATION | AMPLIFICATION CHARACTERISTIC INFORMATION | POSITION INFORMATION | ANTENNA INFORMATION |
|---|---|---|---|---|---|---|---|

| SR DEVICE IDENTIFIER | SUPPORTED FREQUENCY INFORMATION | MODE CAPABILITY INFORMATION | BEAM CAPABILITY INFORMATION | CONTROL DELAY INFORMATION | AMPLIFICATION CHARACTERISTIC INFORMATION | POSITION INFORMATION | ANTENNA INFORMATION |
|---|---|---|---|---|---|---|---|

| FREQUENCY STATE INFORMATION | MODE STATE INFORMATION | BEAM STATE INFORMATION |
|---|---|---|

| SR DEVICE IDENTIFIER | FREQUENCY STATE INFORMATION | MODE STATE INFORMATION | BEAM STATE INFORMATION |
|---|---|---|---|
| SR DEVICE IDENTIFIER | FREQUENCY STATE INFORMATION | MODE STATE INFORMATION | BEAM STATE INFORMATION |

COMMUNICATION CONTROL METHOD, WIRELESS TERMINAL, AND BASE STATION

RELATED APPLICATIONS

The present application is a continuation based on PCT Application No. PCT/JP2022/026683, filed on Jul. 5, 2022, which claims the benefit of Japanese Patent Application No. 2021-113804 filed on Jul. 8, 2021. The content of which is incorporated by reference herein in their entirety.

TECHNICAL FIELD

The present disclosure relates to a communication control method, a wireless terminal, and a base station used in a mobile communication system.

BACKGROUND OF INVENTION

In recent years, a mobile communication system of the fifth generation (5G) has been attracting attention. New Radio (NR), which is a radio access technology of the 5G system, is capable of wide-band transmission via a high frequency band as opposed to Long Term Evolution (LTE), which is a fourth-generation radio access technology.

Since radio waves in the high frequency band such as a millimeter wave band or a terahertz wave band have high rectilinearity, reduction of coverage of a base station is a problem. In order to solve such a problem, a smart repeater (SR) device is gaining attention that relays wireless communication between a base station and a wireless terminal, and is capable of beamforming (see, for example, Non-Patent Document 1). Such an SR device is also referred to as a base station controlled repeater. Such an SR device can extend the coverage of the base station while suppressing occurrence of interference by, for example, amplifying a radio wave received from the base station and transmitting the radio wave through directional transmission.

CITATION LIST

Non-Patent Literature

Non-Patent Document 1: 3GPP written contributions: RWS-210275, "5G eMBB Evolution To 5G Advanced".

SUMMARY

A communication control method according to a first aspect includes: establishing, by a repeater control wireless terminal, a wireless connection to a base station, the repeater control wireless terminal controlling a base station controlled repeater relaying wireless communication between the base station and a wireless terminal; and transmitting, by the base station to the repeater control wireless terminal through wireless communication, one or more repeater control configurations used to control the base station controlled repeater.

A wireless terminal according to a second aspect is a wireless terminal for performing wireless communication with a base station in a mobile communication system, the wireless terminal including: a receiver that receives, from a base station through wireless communication, one or more repeater control configurations used to control a base station controlled repeater relaying wireless communication between the base station and another wireless terminal; and a controller that controls the base station controlled repeater based on the one or more repeater control configurations.

A base station according to a third aspect is a base station for performing wireless communication with a wireless terminal in a mobile communication system, the base station including: a transmitter that transmits, to a wireless terminal through wireless communication, one or more repeater control configurations used to control a base station controlled repeater, the wireless terminal controlling the base station controlled repeater relaying wireless communication between the base station and another wireless terminal.

BRIEF DESCRIPTION OF THE DRAWINGS

FIG. 11 is a diagram illustrating a configuration of an SR control configuration according to an embodiment.

FIG. 12 is a diagram illustrating uplink signaling from the SR-UE to the gNB according to an embodiment.

FIG. 13 is a diagram illustrating a configuration of SR device capability information according to an embodiment.

FIG. 14 is a diagram illustrating a configuration of SR device capability information according to an embodiment.

DESCRIPTION OF EMBODIMENTS

Efficient coverage extension may be achieved using an SR device by operating an SR device in coordination with an operation of a base station. However, since the technical specifications of the conventional mobile communication system do not define a mechanism for the base station to control the SR device, a problem is that efficient coverage extension using the SR device is difficult to perform.

The present disclosure provides a communication control method, a wireless terminal, and a base station capable of realizing efficient coverage extension using an SR device.

A mobile communication system according to an embodiment is described with reference to the drawings. In the description of the drawings, the same or similar parts are denoted by the same or similar reference signs.

Embodiment

Configuration of Mobile Communication System

Figure 1:
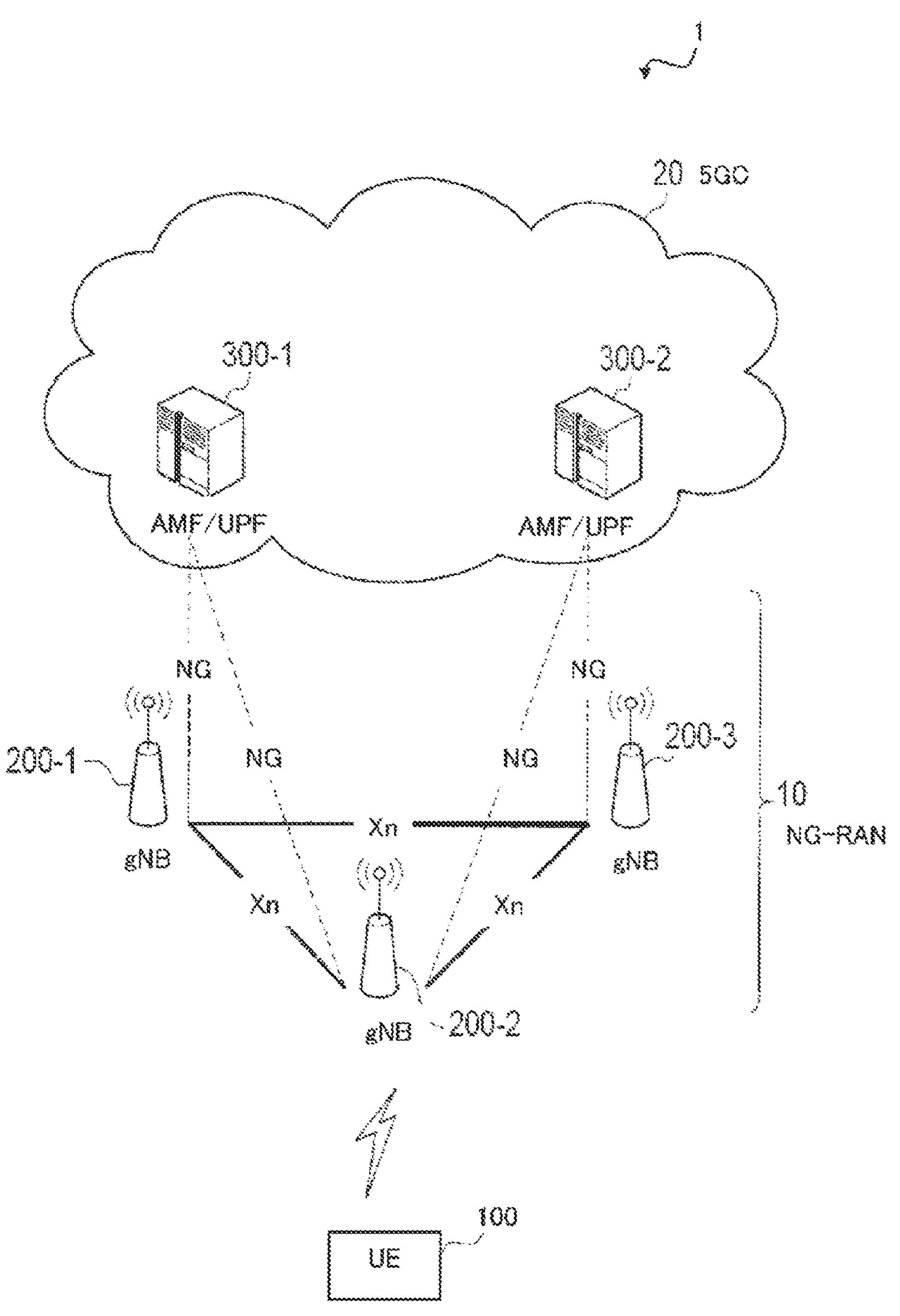
FIG. 1 is a diagram illustrating a configuration of a mobile communication system according to an embodiment.

First, a configuration of a mobile communication system in an embodiment is described. FIG. 1 is a diagram illustrating a configuration of a mobile communication system 1 according to an embodiment. The mobile communication system 1 complies with the 5th Generation System (5GS) of the 3GPP standard. The description below takes the 5G/NR as an example, but the 4G/LTE may be at least partially applied to the mobile communication system 1. A sixth generation (6G) system may be at least partially applied to the mobile communication system 1.

The mobile communication system 1 includes a wireless terminal (User Equipment (UE) 100, a 5G radio access network (Next Generation Radio Access Network (NG-RAN)) 10, and a 5G Core Network (5GC) 20.

The UE 100 is a mobile wireless communication apparatus. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication to the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
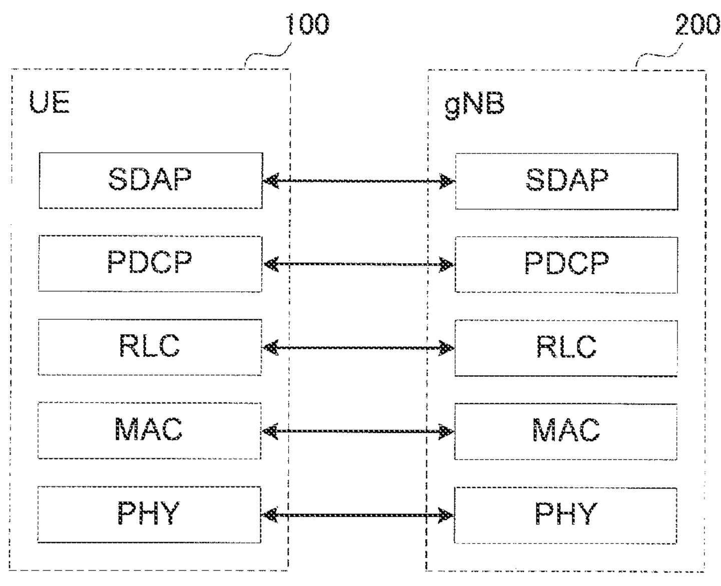
FIG. 2 is a diagram illustrating a configuration of a protocol stack of a radio interface of a user plane handling data.

FIG. 2 is a diagram illustrating a configuration of a protocol stack of a radio interface of a user plane handling data.

As illustrated in FIG. 2, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 3:
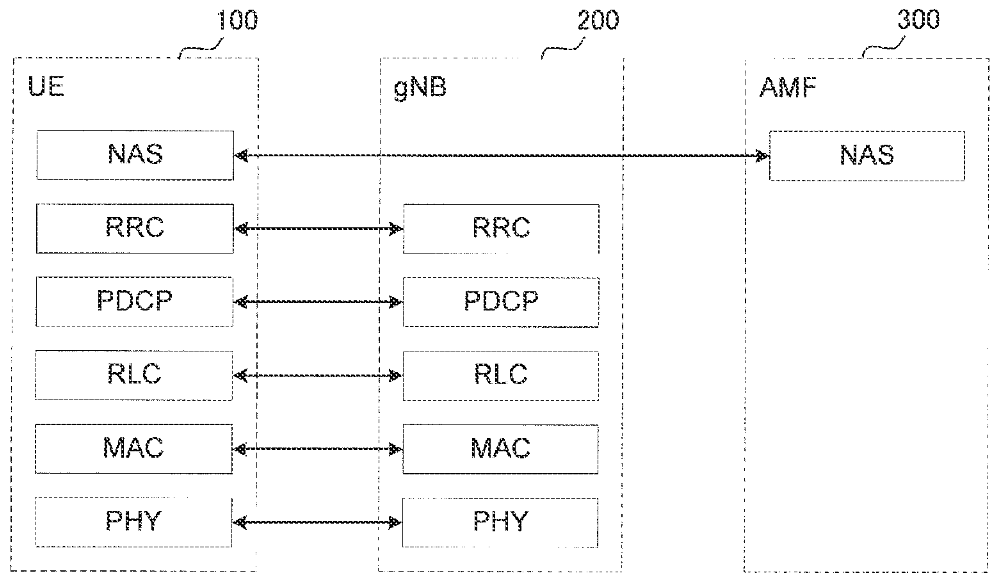
FIG. 3 is a diagram illustrating a configuration of a protocol stack of a radio interface of a control plane handling signaling (control signal).

FIG. 3 is a diagram illustrating a configuration of a protocol stack of a radio interface of a control plane handling signaling (a control signal).

As illustrated in FIG. 3, the protocol stack of the radio interface of the control plane includes a Radio Resource Control (RRC) layer and a Non-Access Stratum (NAS) layer instead of the SDAP layer illustrated in FIG. 2.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a wireless connection between the RRC of the UE 100 and the RRC of the gNB 200 (RRC connection) exists, the UE 100 is in an RRC connected state. When the wireless connection between the RRC of the UE 100 and the RRC of the gNB 200 (RRC connection) does not exist, the UE 100 is in an RRC idle state. When the wireless connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling is transmitted between the NAS layer of the UE 100 and the NAS layer of the AMF 300. Note that the UE 100 includes an application layer other than the protocol of the radio interface.

Application Scenario for SR Device

Figure 4:
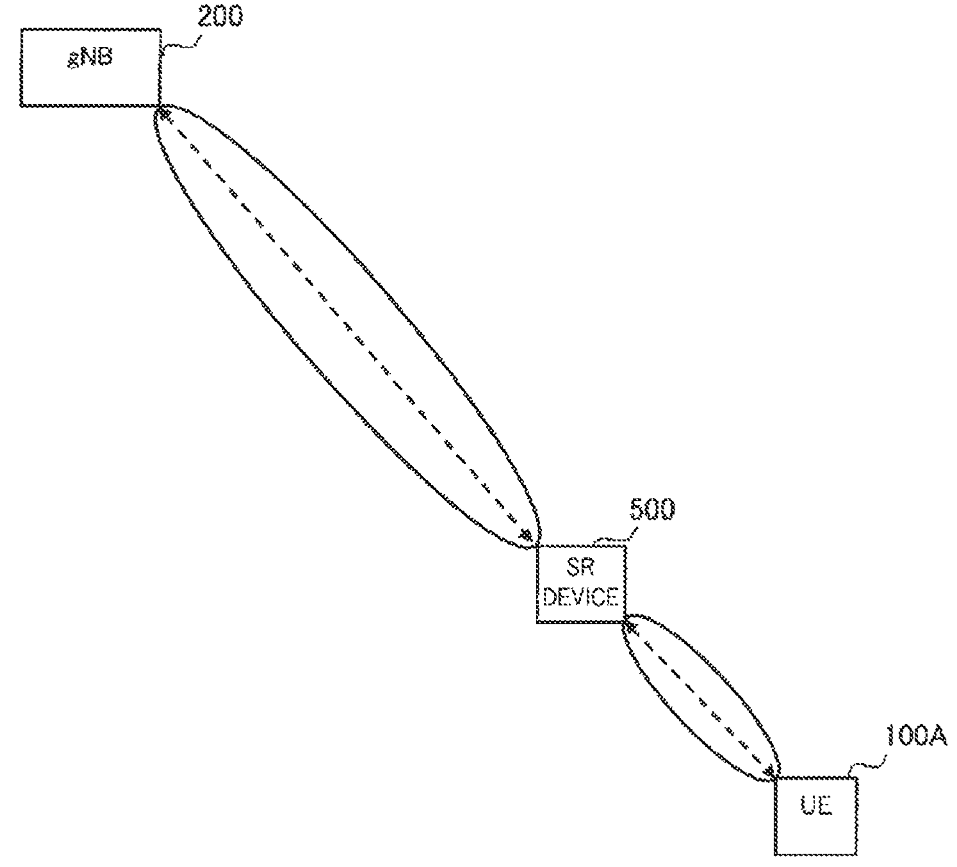
FIG. 4 is a diagram illustrating an application scenario for an SR device according to an embodiment.
Figure 5:
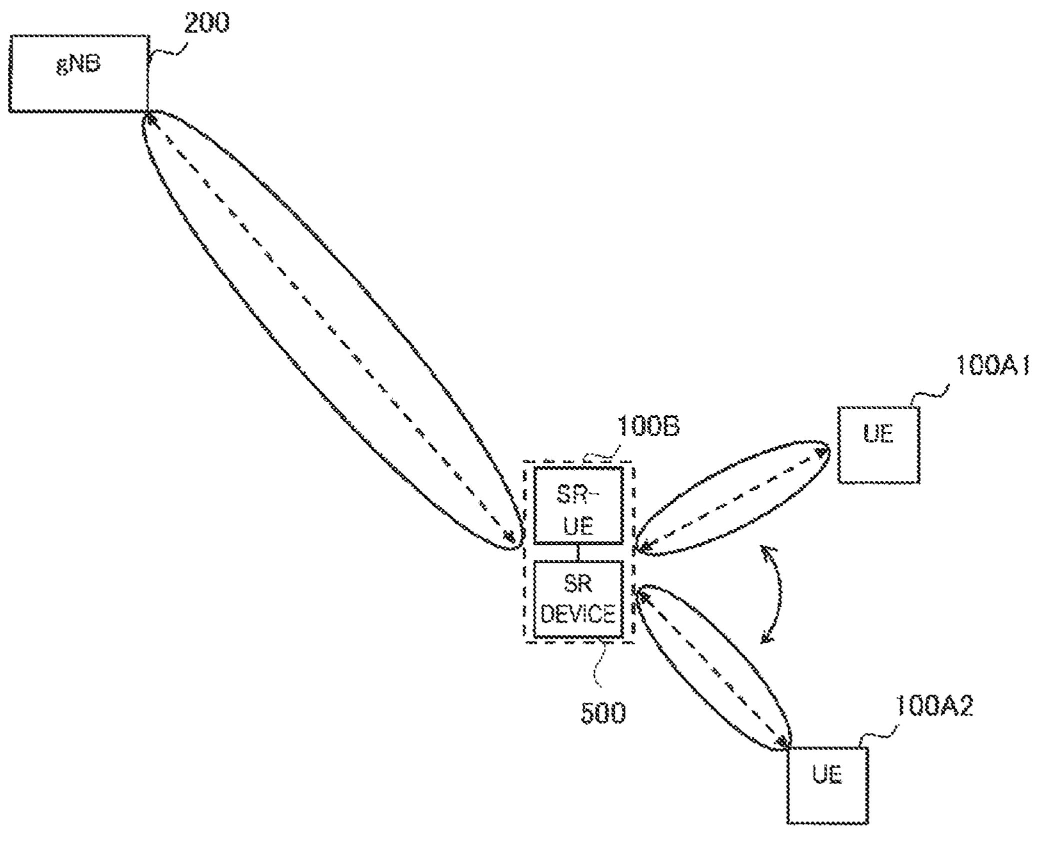
FIG. 5 is a diagram illustrating an application scenario for an SR device according to an embodiment.

An application scenario for the SR device in an embodiment is described. FIGS. 4 and 5 are diagrams illustrating application scenarios for the SR device according to an embodiment. The SR device is an example of a base station controlled repeater.

The 5G/NR is capable of wide-band transmission via a high frequency band compared to the 4G/LTE. Since radio waves in the high frequency band such as a millimeter wave band or a terahertz wave band have high rectilinearity, a problem is reduction of coverage of the gNB 200. In FIG. 4, a UE 100A may be located outside a coverage area of the gNB 200, for example, outside an area where the UE 100A can receive radio waves directly from the gNB 200. The UE 100A may not communicate with the gNB 200 within a line of sight because of obstacles existing between the gNB 200 and the UE 100A.

In the embodiment, a smart repeater (SR) device 500 is introduced into the mobile communication system 1, the SR device 500 relaying wireless communication between the gNB 200 and the UE 100A and being capable of beamforming. For example, the SR device 500 amplifies a radio wave (radio signal) received from the gNB 200 and transmits the radio wave through directional transmission. To be specific, the SR device 500 receives a radio signal transmitted by the gNB 200 through beamforming. Then, the SR device 500 amplifies the received radio signal and transmits the amplified radio signal through directional transmission. Here, the SR device 500 may transmit a radio signal with a fixed directivity, and the SR device 500 may transmit a radio signal with a variable (adaptive) directional beam. This can efficiently extend the coverage of the gNB 200.

Although the example is described hereinabove in which the SR device 500 is applied to downlink communication from the gNB 200 to the UE 100A, note that the SR device 500 can also be applied to uplink communication from the UE 100A to the gNB 200.

In the embodiment, as illustrated in FIG. 5, a new UE (hereinafter referred to as “SR-UE”) is introduced for controlling the SR device 500. The SR-UE is an example of a repeater control wireless terminal. An SR-UE 100B is also an example of an SR wireless terminal. The SR-UE 100B controls the SR device 500 in cooperation with the gNB 200 by establishing a wireless connection to the gNB 200 and performing wireless communication to the gNB 200. By doing so, efficient coverage extension can be achieved using the SR device 500. The SR-UE 100B controls the SR device 500 in accordance with an SR control configuration from the gNB 200. The SR-UE 100B may autonomously control the SR device 500 in accordance with a preconfigured SR control configuration even if the SR control configuration is not configured from the gNB 200. The SR control configuration is an example of a repeater control configuration.

The SR-UE 100B may be configured separately from the SR device 500. For example, the SR-UE 100B may be located near the SR device 500 and may be electrically connected to the SR device 500. The SR-UE 100B may be connected to the SR device 500 by wire or wireless. The SR-UE 100B may be configured to be integrated with the SR device 500. The SR-UE 100B and the SR device 500 may be fixedly installed at a coverage edge (cell edge) of the base station 200, or on a wall surface or a window of any building, for example. The SR-UE 100B and the SR device 500 may be installed in, for example, a vehicle to be movable. One SR-UE 100B may control a plurality of SR devices 500.

In the example illustrated in FIG. 5, the SR device 500 dynamically or semi-statically changes a beam to be transmitted or received. For example, the SR device 500 forms a beam toward each of a UE 100A1 and a UE 100A2. The SR device 500 may also form a beam toward the gNB 200. For example, in a communication resource between the gNB 200 and the UE 100A1, the SR device 500 transmits a radio wave received from the gNB 200 toward the UE 100A1 through beamforming and/or transmits a radio wave received from the UE 100A1 toward the gNB 200 through beamforming. In a communication resource between the gNB 200 and the UE 100A2, the SR device 500 transmits a radio wave received from the gNB 200 toward the UE 100A2 through beamforming and/or transmits a radio wave received from the UE 100A2 toward the gNB 200 through beamforming. Instead of or in addition to beamforming, the SR device 500 may perform null forming (so-called null steering) toward a UE 100 which is not a communication partner (not shown) and/or a neighboring base station gNB 200 (not shown) to suppress the interference. Hereinafter, a beam (beamforming) may be interpreted as a null (null steering). Alternatively, a beam (beamforming) may be interpreted as a beam and a null (beamforming and null steering).

Figure 6:
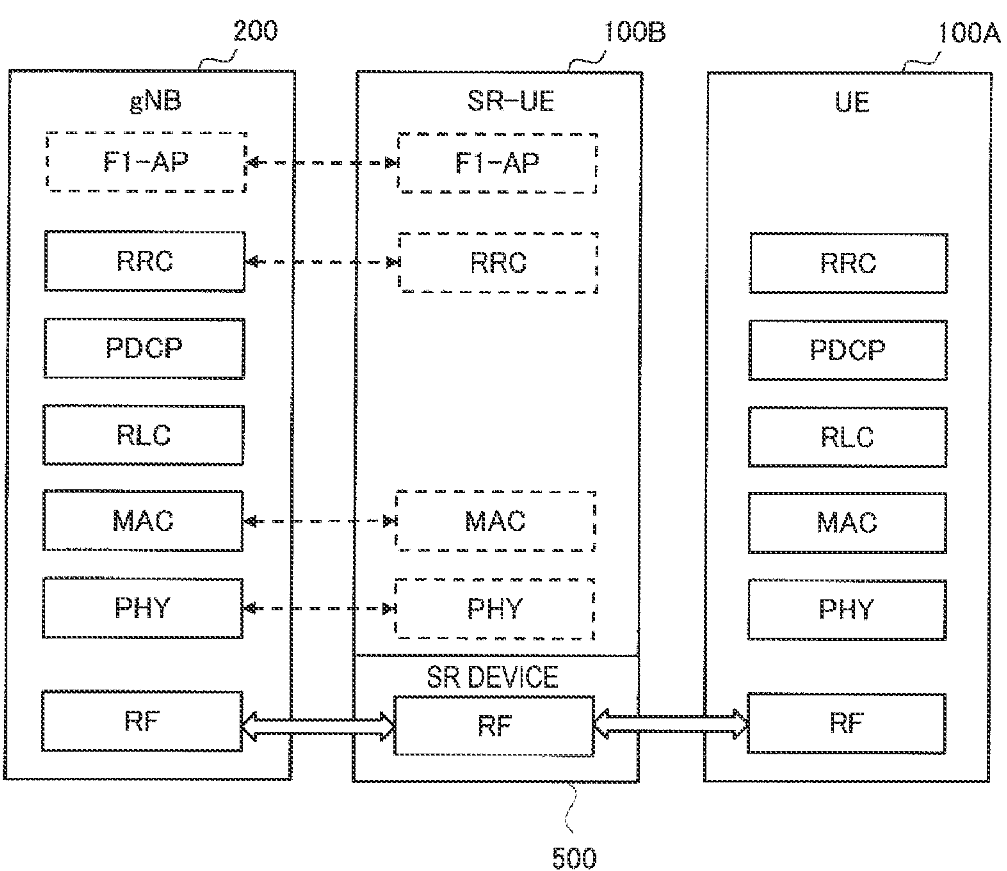
FIG. 6 is a diagram illustrating a configuration example of a protocol stack in the mobile communication system that includes an SR-UE (SR wireless terminal) according to an embodiment.

FIG. 6 is a diagram illustrating a configuration example of a protocol stack in the mobile communication system 1 that includes the SR device 500 and the SR-UE 100B according to an embodiment.

As illustrated in FIG. 6, the SR device 500 relays radio signals transmitted and received between the gNB 200 and the UE 100A. The SR device 500 has a radio frequency (RF) function of amplifying and relaying a received radio signal, and performs directional transmission through beamforming (for example, analog beamforming).

The SR-UE 100B includes at least one layer (entity) of PHY, MAC, RRC, and F1-AP (application protocol). The F1-AP is a type of a fronthaul interface. The SR-UE 100B communicates downlink signaling and/or uplink signaling, which will be described below, with the gNB 200 through at least one of the PHY, the MAC, RRC, and the F1-AP. Assuming that the SR-UE 100B is a type or a part of the base station, the SR-UE 100B may communicate with the gNB 200 through an AP of Xn (Xn-AP) which is an inter-base station interface.

Configurations of SR-UE and SR Device

Figure 7:
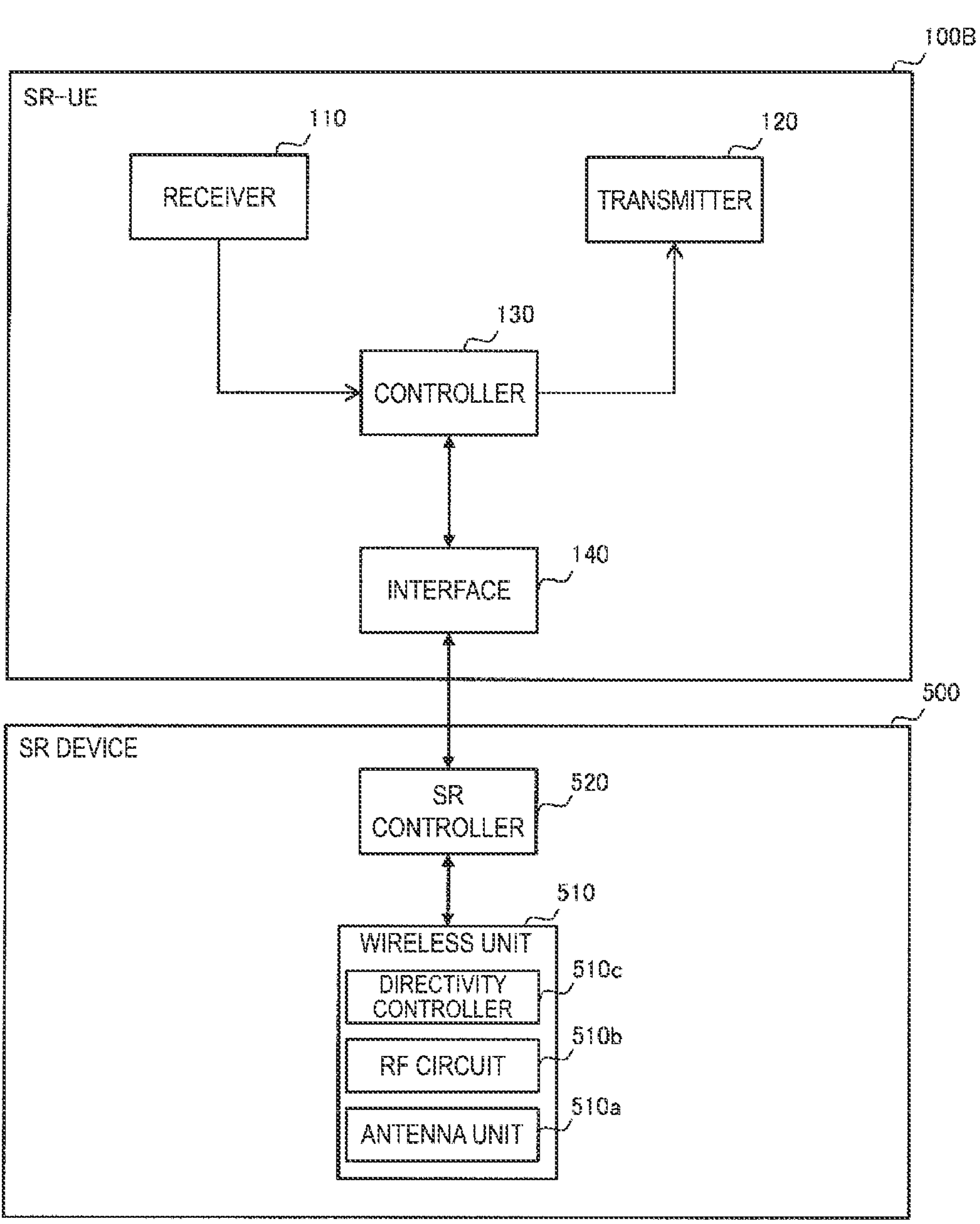
FIG. 7 is a diagram illustrating a configuration of an SR-UE and an SR device according to an embodiment.

In an embodiment, configurations of the SR-UE 100B (SR wireless terminal) and the SR device 500 are described. FIG. 7 is a diagram illustrating the configurations of the SR-UE 100B and the SR device 500 according to an embodiment.

As illustrated in FIG. 7, the SR-UE 100B includes a receiver 110, a transmitter 120, a controller 130, and an interface 140.

The receiver 110 performs various types of reception under control of the controller 130. The receiver 110 includes an antenna and a reception device. The reception device converts a radio wave received through the antenna (radio signal) into a baseband signal (a reception signal) and outputs the resulting signal to the controller 130. The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control in the SR-UE 100B. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The controller 130 performs a function of at least one layer of the PHY, the MAC, the RRC, and the F1-AP.

The interface 140 is electrically connected to the SR device 500. The controller 130 controls the SR device 500 via the interface 140. Note that when the SR-UE 100B is configured to be integrated with the SR device 500, the SR-UE 100B may not include the interface 140. The receiver 110 and the transmitter 120 of the SR-UE 100B may be configured to be integrated with a wireless unit 510 of the SR device 500.

The SR device 500 includes the wireless unit 510 and an SR controller 520. The wireless unit 510 includes an antenna unit 510*a* including a plurality of antennas, an RF circuit 510*b* including an amplifier, and a directivity controller 510*c* controlling directivity of the antenna unit 510*a*. The RF circuit 510*b* amplifies and relays (transmits) radio signals transmitted and received by the antenna unit 510*a*. The RF circuit 510*b* may convert a radio signal, which is an analog signal, into a digital signal, and may reconvert the digital signal into an analog signal after digital signal processing. The directivity controller 510*c* may perform analog beamforming by analog signal processing or digital beamforming by the digital signal processing. Alternatively, the directivity controller 510*c* may perform analog and digital hybrid beamforming.

The SR controller 520 controls the wireless unit 510 in response to a control signal from the controller 130 of the SR-UE 100B. The SR controller 520 may include at least one processor. The SR controller 520 may output at least one of information relating to a capability of the SR device 500 and information relating to a control state in the SR device 500 to the SR-UE 100B. Note that when the SR-UE 100B is configured to be integrated with the SR device 500, the controller 130 of the SR-UE 100B may also be configured to be integrated with the SR controller 520 of the SR device 500.

In an embodiment, the receiver 110 of the SR-UE 100B receives one or more SR control configurations used to control the SR device 500 from the gNB 200 through wireless communication. The controller 130 of the SR-UE 100B controls the SR device 500 based on the one or more SR control configurations. The SR control configuration is an example of the downlink signaling from the gNB 200 to the SR-UE 100B. This enables the gNB 200 to control the SR device 500 via the SR-UE 100B.

In an embodiment, the controller 130 of the SR-UE 100B controls the SR device 500. The controller 130 in the SR-UE 100B acquires SR device information indicating at least one of the capability of the SR device 500 and the control state of the SR device 500 from the SR device 500 (SR controller 520). The transmitter 120 of the SR-UE 100B transmits the acquired SR device information to the gNB 200 through wireless communication. The SR device information is an example of the uplink signaling from the SR-UE 100B to the gNB 200. This enables the gNB 200 to grasp the capability and control state of the SR device 500.

Configuration of Base Station

Figure 8:
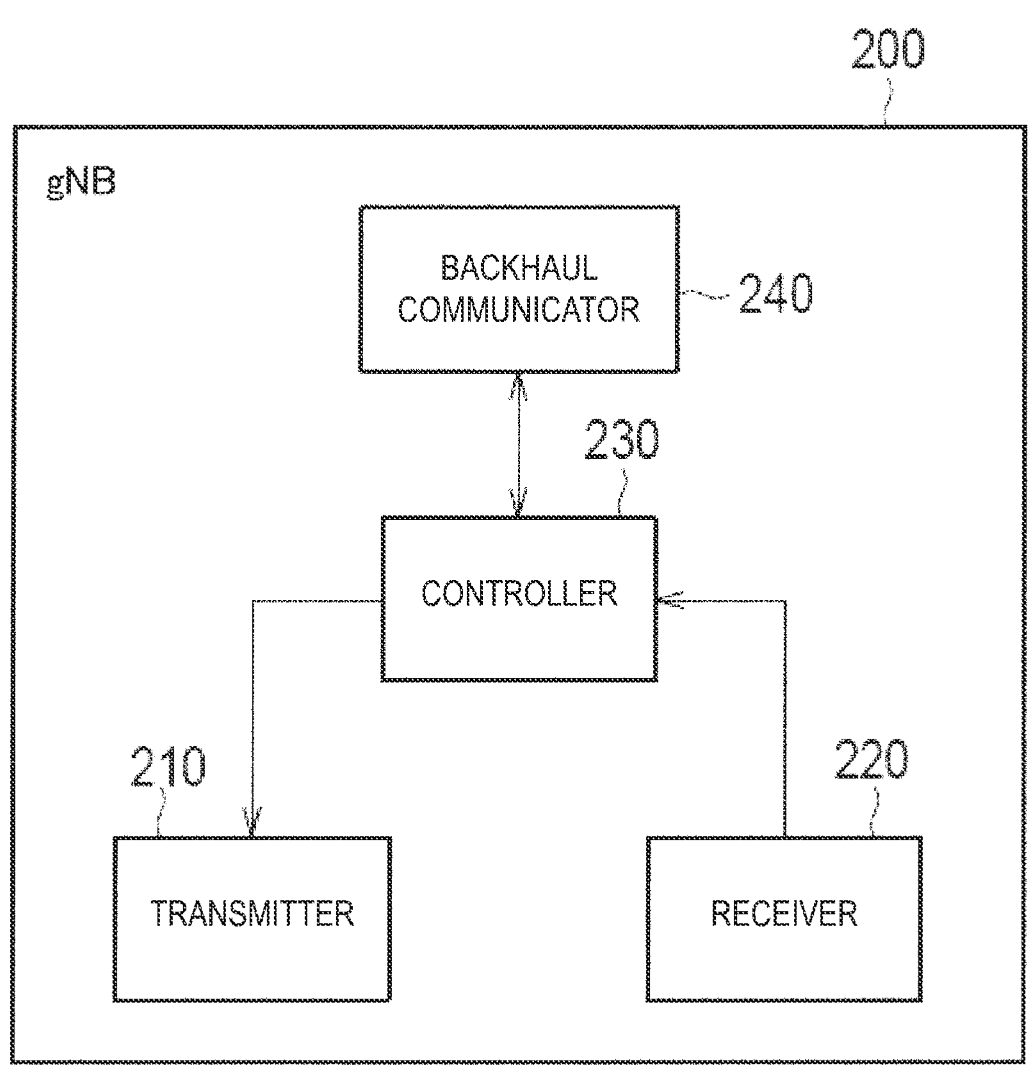
FIG. 8 is a diagram illustrating a configuration of a gNB (base station) according to an embodiment.

A configuration of the gNB 200 (base station) in an embodiment is described. FIG. 8 is a diagram illustrating a configuration of the gNB 200 according to an embodiment.

As illustrated in FIG. 8, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna. The receiver 220 performs various types of reception under control of the controller 230. The receiver 220 includes an antenna and a reception device. The reception device converts a radio signal received through the antenna into a baseband signal (a reception signal) and outputs the resulting signal to the controller 230. The transmitter 210 and the receiver 220 may be capable of beamforming using a plurality of antennas.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

In an embodiment, the transmitter 210 of the gNB 200 transmits one or more SR control configurations used to control the SR device 500 to the SR-UE 100B controlling the SR device 500 through wireless communication. The SR control configuration is an example of the downlink signaling from the gNB 200 to the SR-UE 100B. This enables the gNB 200 to control the SR device 500 via the SR-UE 100B.

In an embodiment, the receiver 220 of the gNB 200 receives the SR device information indicating at least one of the capability of the SR device 500 and the control state of the SR device through wireless communication 500 from the SR-UE 100B controlling the SR device 500. The SR device information is an example of the uplink signaling from the SR-UE 100B to the gNB 200. This enables the gNB 200 to grasp the capability and control state of the SR device 500.

Operation of Mobile Communication System

Operations of the mobile communication system 1 according to an embodiment will be described.

(1) Downlink Signaling

Figures 9, 10:
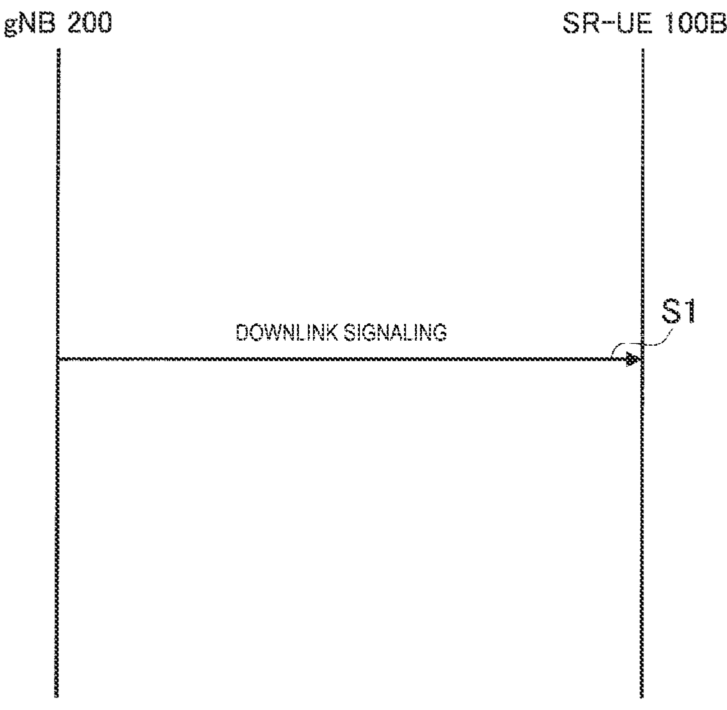
FIG. 9 is a diagram illustrating downlink signaling from the gNB to the SR-UE according to an embodiment.
FIG. 10 is a diagram illustrating a configuration of an SR control configuration according to an embodiment.

FIG. 9 is a diagram illustrating the downlink signaling from the gNB 200 to the SR-UE 100B according to an embodiment.

The gNB 200 (transmitter 210) transmits downlink signaling to the SR-UE 100B. The downlink signaling may be an RRC message that is RRC layer signaling, a MAC Control Element (MAC CE) that is MAC layer signaling, and/or downlink control information (DCI) that is PHY layer signaling. The downlink signaling may be UE-specific signaling, or broadcast signaling. The downlink signaling may be a fronthaul message (for example, F1-AP message). Assuming that the SR-UE 100B is a type or a part of the base station, the SR-UE 100B may communicate with the gNB 200 through an AP of Xn (Xn-AP) which is an inter-base station interface.

For example, as illustrated in FIG. 9, the gNB 200 (transmitter 210) transmits the downlink signaling including the SR control configuration used to control the SR device 500 to the SR-UE 100B that has established a wireless connection to the gNB 200 (step S1). The gNB 200 (transmitter 210) may include the SR control configuration in an RRC Reconfiguration message that is a type of a UE-specific RRC message to transmit to the SR-UE 100B. The downlink signaling may be a message of a layer (for example, an SR application) higher than the RRC layer. The downlink signaling may be transmitting a message of a layer higher than the RRC layer encapsulated with a message of a layer equal to or lower than the RRC layer.

Note that the SR-UE 100B (transmitter 120) may transmit a response message with respect to the downlink signaling from the gNB 200 in the uplink. The response message may be transmitted in response to the SR device 500 completing the configuration designated by the downlink signaling or receiving the configuration.

As illustrated in FIG. 10, the SR control configuration may include frequency configuration information to configure a center frequency of a radio wave (for example, a component carrier) to be relayed by the SR device 500. When the SR control configuration received from the gNB 200 includes the frequency configuration information, the SR-UE 100B (controller 130) controls the SR device 500 such that the SR device 500 relays a radio wave as a target whose center frequency is indicated by the frequency configuration information. The SR control configuration may include a plurality of pieces of frequency configuration information to configure center frequencies to be different from each other. Since the SR control configuration includes the frequency configuration information, the gNB 200 can designate the center frequency of the radio wave to be relayed by the SR device 500 via the SR-UE 100B.

The SR control configuration may include mode configuration information to configure an operation mode of the SR device 500. The mode configuration information may be associated with the frequency configuration information (center frequency). The operation mode may be any one of a mode in which the SR device 500 performs non-directional transmission and/or reception, a mode in which the SR device 500 performs fixed-directional transmission and/or reception, a mode in which the SR device 500 performs transmission and/or reception with a variable directional beam, and a mode in which the SR device 500 performs Multiple Input Multiple Output (MIMO) relay transmission. The operation mode may be either a beamforming mode (that is, a mode in which improvement of a desired wave is emphasized) and a null steering mode (that is, a mode in which suppression of an interference wave is emphasized). When the SR control configuration received from the gNB 200 includes the mode configuration information, the SR-UE 100B (controller 130) controls the SR device 500 such that the SR device 500 operates in the operation mode indicated by the mode configuration information. Since the SR control configuration includes the mode configuration information, the gNB 200 can designate the operation mode of the SR device 500 via the SR-UE 100B.

Here, the mode in which the SR device 500 performs non-directional transmission and/or reception is a mode in which the SR device 500 performs relay in all directions and may be referred to as an omnidirectional mode.

The mode in which the SR device 500 performs fixed-directional transmission and/or reception may be a directivity mode realized by one directional antenna and/or a beamforming mode realized by applying fixed phase and amplitude control (antenna weight control) to a plurality of antennas. Any of these modes may be designated (configured) from the gNB 200 to the SR-UE 100B.

The mode in which the SR device 500 performs transmission and/or reception with a variable directional beam may be a mode in which analog beamforming is performed or a mode in which digital beamforming is performed. The mode may be a mode in which hybrid beamforming is performed. The mode may be a mode for forming an adaptive beam specific to a UE 100A. Any of these modes may be designated (configured) from the gNB 200 to the SR-UE 100B.

Note that in the operation mode in which beamforming is performed, beam configuration information described below may be provided from the gNB 200 to the SR-UE 100B.

The mode in which the SR device 500 performs MIMO relay transmission may be a mode in which single-user (SU) spatial multiplexing is performed, a mode in which multi-user (MU) spatial multiplexing is performed, and/or a mode in which transmit diversity is performed. Any of these modes may be designated (configured) from the gNB 200 to the SR-UE 100B.

The operation mode may include a mode in which relay transmission by the SR device 500 is turned on (activated) and a mode in which relay transmission by the SR device 500 is turned off (deactivated). Any of these modes may be designated (configured) from the gNB 200 to the SR-UE 100B.

The SR control configuration may include the beam configuration information to configure a transmission direction, a transmission weight, or a beam pattern for the SR device 500 to perform directional transmission. The beam configuration information may be associated with the frequency configuration information (center frequency). The beam configuration information may include a Precoding Matrix Indicator (PMI). Since the SR control configuration includes the beam configuration information, the gNB 200 can designate a transmission directivity of the SR device 500 via the SR-UE 100B.

The SR control configuration may include amplification degree configuration information to configure a degree for the SR device 500 to amplify a radio wave (amplification gain) or transmission output power. The amplification degree configuration information may be associated with the frequency configuration information (center frequency). The amplification degree configuration information may be information to configure any one of an amplification gain, a beamforming gain, and an antenna gain of the SR device 500. The amplification degree configuration information may be information to configure the transmission output power of the SR device 500.

As illustrated in FIG. 11, when the SR-UE 100B controls a plurality of SR devices 500, the gNB 200 (transmitter 210) may transmit the SR control configuration for each SR device 500 to the SR-UE 100B. In this case, the SR control configuration may include an identifier of the corresponding SR device 500 (SR device identifier). The SR-UE 100B (controller 130) controlling the plurality of SR devices 500 determines the SR device 500 to which the SR control configuration is applied, based on the SR device identifier included in the SR control configuration received from the gNB 200. Note that the SR device identifier may be transmitted together with the SR control configuration from the SR-UE 100B to the gNB 200 even when the SR-UE 100B controls only one SR device 500.

As described above, the SR-UE 100B (controller 130) controls the SR device 500 based on the SR control configuration from the gNB 200. This enables the gNB 200 to control the SR device 500 via the SR-UE 100B.

(2) Uplink Signaling

FIG. 12 is a diagram illustrating uplink signaling from the SR-UE 100B to the gNB 200 according to an embodiment.

The SR-UE 100B (transmitter 210) transmits uplink signaling to the gNB 200. The uplink signaling may be an RRC message that is RRC layer signaling, a MAC CE that is MAC layer signaling, and/or uplink control information (UCI) that is PHY layer signaling. The uplink signaling may be a fronthaul message (e.g., F1-AP message) and/or an inter-base station message (e.g., Xn-AP message). The uplink signaling may be a message of a layer (for example, an SR application) higher than the RRC layer. The uplink signaling may be transmitting a message of a layer higher than the RRC layer encapsulated with a message of a layer equal to or lower than the RRC layer. Note that the gNB 200 (transmitter 210) may transmit a response message with respect to the uplink signaling from the SR-UE 100B in the downlink, and the SR-UE 100B (receiver 110) may receive the response message.

For example, the SR-UE 100B (transmitter 120) that has established a wireless connection to the gNB 200 transmits the SR device information indicating at least one of the capability of the SR device 500 and the control state of the SR device 500 to the gNB 200 through wireless communication (step S2). Specifically, the SR device information includes SR device capability information indicating at least one of the capability of the SR device 500 and control state information indicating the control state of the SR device 500. The SR-UE 100B (transmitter 120) may include the SR device information in a UE Capability message or a UE Assistant Information message that is a type of the RRC message to transmit to the gNB 200. The SR-UE 100B (transmitter 120) may transmit the SR device information (SR device capability information and/or control state information) to the gNB 200 in response to a request or inquiry from the gNB 200. The SR-UE 100B (transmitter 120) may periodically transmit the SR device information (particularly, control state information) to the gNB 200 in response to the configuration from the gNB 200. The transmission period may be configured in the SR-UE 100B from the gNB 200.

As illustrated in FIG. 13, the SR device capability information may include supported frequency information indicating a frequency supported by the SR device 500. The supported frequency information may be a numerical value or index indicating a center frequency of the frequencies supported by the SR device 500 and/or a numerical value or index indicating a range of the frequencies supported by the SR device 500. When the SR device capability information received from the SR-UE 100B includes the supported frequency information, the gNB 200 (controller 230) can grasp the frequency supported by the SR device 500, based on the supported frequency information. The gNB 200 (controller 230) may configure the center frequency of the radio wave targeted by the SR device 500 within the range of the frequencies supported by the SR device 500.

The SR device capability information may include mode capability information regarding operation modes or switching between the operation modes that can be supported by the SR device 500. The operation mode may be, as described above, at least any one of a mode in which the SR device 500 performs non-directional transmission and/or reception, a mode in which the SR device 500 performs fixed-directional transmission and/or reception, a mode in which the SR device 500 performs transmission and/or reception with a variable directional beam, and a mode in which the SR device 500 performs Multiple Input Multiple Output (MIMO) relay transmission. The operation mode may be either a beamforming mode (that is, a mode in which improvement of a desired wave is emphasized) and a null steering mode (that is, a mode in which suppression of an interference wave is emphasized). The mode capability information may be information indicating which operation mode among these operation modes the SR device 500 can support. The mode capability information may be information indicating between which operation modes among these operation modes the mode switching is possible. When the SR device capability information received from the SR-UE 100B includes the mode capability information, the gNB 200 (controller 230) can grasp the operation modes and mode switching supported by the SR device 500, based on the mode capability information. The gNB 200 (controller 230) may configure the operation mode of the SR device 500 within a range of the grasped operation modes and mode switching.

The SR device capability information may include the beam capability information indicating a beam variable range, a beam variable resolution, or a variable pattern number when the SR device 500 performs transmission and/or reception with a variable directional beam. The beam capability information may be, for example, information indicating a variable range of a beam angle with respect to the horizontal direction or the vertical direction (for example, control of 30° to 90° is possible) and/or information indicating an absolute angle. The beam capability information may be represented by a direction and/or an elevation angle at which a beam is directed. The beam capability information may be information indicating an angular change for each variable step (for example, horizontal 5°/step, vertical 10°/step) and/or information indicating the number of variable steps (for example, horizontal 10 steps, vertical 20 steps). The beam capability information may be information indicating the variable pattern number of a beam in the SR device 500 (for example, a total of 10 patterns of beam patterns 1 to 10). When the SR device capability information received from the SR-UE 100B includes the beam capability information, the gNB 200 (controller 230) can grasp the beam angle change or beam patterns that can be supported by the SR device 500, based on the beam capability information. The gNB 200 (controller 230) may configure a beam of the SR device 500 within a range of the grasped beam angular change or beam patterns. These pieces of beam capability information may be null capability information. For the null capability information, a null control capability when null steering is performed is indicated.

Note that the gNB 200 may not grasp an actual beam direction for each variable pattern. For example, first, the gNB 200 configures the beam pattern 1 for the SR device 500, and then performs transmission to the UE 100A via the SR device 500 to grasp a reception state of the UE 100A (grasp a state from ACK/NACK, CSI feedback, measurement report, or the like). Second, the gNB 200 configures the beam pattern 2 for the SR device 500, and then performs transmission to the UE 100A via the SR device 500 to grasp the reception state of the UE 100A. Third, the gNB 200 configures the beam pattern 3 for the SR device 500, and then performs transmission to the UE 100A via the SR device 500 to grasp the reception state of the UE 100A. Finally, the gNB 200 determines the beam pattern involving the best reception state of the UE 100A and configures this pattern for the SR device 500.

The SR device capability information may include control delay information indicating a control delay time in the SR device 500. For example, the control delay information is information indicating a delay time (for example, 1 ms, 10 ms . . . ) from a timing at which the UE 100 receives the SR control configuration or a timing at which the UE 100 transmits configuration completion for the SR control configuration to the gNB 200 until the UE 100 completes control (change of the operation mode or change of the beam) according to the SR control configuration. When the SR device capability information received from the SR-UE 100B includes the control delay information, the gNB 200 (controller 230) can grasp the control delay time in the SR device 500, based on the control delay information.

The SR device capability information may include amplification characteristic information relating to radio wave amplification characteristics or output power characteristics in the SR device 500. The amplification characteristic information may be information indicating an amplifier gain (dB), a beamforming gain (dB), and an antenna gain (dBi) of the SR device 500. The amplification characteristic information may be information indicating an amplification variable range (for example, 0 dB to 60 dB) in the SR device 500. The amplification characteristic information may be information indicating the number of steps (for example, 10 steps) of the amplification degrees that can be changed by the SR device 500 or the amplification degree for each variable step (for example, 10 dB/step). The amplification characteristic information may be information indicating an output power variable range (for example, 0 dBm to 30 dBm) of the SR device 500. The amplification characteristic information may be information indicating the number of steps (for example, 10 steps) of the output power that can be changed by the SR device 500 or the output power for each variable step (for example, 10 dBm/step).

The SR device capability information may include position information indicating an installation location of the SR device 500. The position information may include any one or more of latitude, longitude, and altitude. The position information may include information indicating a distance and/or an installation angle of the SR device 500 with respect to the gNB 200. The installation angle may be a relative angle with respect to the gNB 200, or a relative angle with respect to, for example, north, vertical, or horizontal. The installation location may be position information of a place where the antenna unit 510*a* of the SR device 500 is installed.

The SR device capability information may include antenna information indicating the number of antennas included in the SR device 500. The antenna information may be information indicating the number of antenna ports included in the SR device 500. The antenna information may be information indicating a degree of freedom of the directivity control (beam or null formation). The degree of freedom indicates how many beams can be formed (controlled) and is usually "(the number of antennas)−1". For example, in the case of two antennas, the degree of freedom is one. In the case of two antennas, an 8-shaped beam pattern is formed, but the directivity control can be performed only in one direction, so that the degree of freedom is one.

As illustrated in FIG. 14, when the SR-UE 100B controls a plurality of SR devices 500, the SR-UE 100B (transmitter 120) may transmit the SR device capability information for each SR device 500 to the gNB 200. In this case, the SR device capability information may include an identifier of the corresponding SR device 500 (SR device identifier). When the SR-UE 100B controls a plurality of SR devices 500, the SR-UE 100B (transmitter 120) may transmit information indicating at least one of the identifier of each of the plurality of SR devices 500 and the number of the plurality of SR devices 500. Note that the SR device identifier may be transmitted together with the SR device capability information from the SR-UE 100B to the gNB 200 even when the SR-UE 100B controls only one SR device 500.

Figures 15, 16:
FIG. 15 is a diagram illustrating a configuration of control state information according to an embodiment.
FIG. 16 is a diagram illustrating a configuration of control state information according to an embodiment.

As illustrated in FIG. 15, the control state information may include frequency state information indicating a center frequency of a radio wave to be relayed by the SR device 500. The frequency state information may be information indicating the latest (current) center frequency of the radio wave to be relayed by the SR device 500 at a transmission time point of the control state information. When the control state information received from the SR-UE 100B includes the frequency state information, the gNB 200 (controller 230) can grasp the center frequency of the radio wave to be relayed by the SR device 500 based on the frequency state information.

The control state information may include mode state information indicating an operation mode of the SR device 500. The mode state information may be information indicating the latest (current) operation mode of the SR device 500 at the transmission time point of the control state information. The operation mode may be, as described above, any one of a mode in which the SR device 500 performs non-directional transmission and/or reception, a mode in which the SR device 500 performs fixed-directional transmission and/or reception, a mode in which the SR device 500 performs transmission and/or reception with a variable directional beam, and a mode in which the SR device 500 performs Multiple Input Multiple Output (MIMO) relay transmission. The operation mode may be either a beamforming mode (that is, a mode in which improvement of a desired wave is emphasized) and a null steering mode (that is, a mode in which suppression of an interference wave is emphasized). When the control state information received from the SR-UE 100B includes the mode state information, the gNB 200 (controller 230) can grasp the operation mode of the SR device 500, based on the mode state information.

The control state information may include beam state information indicating a transmission direction, a transmission weight, or a beam pattern for the SR device 500 to perform directional transmission. The beam state information may be information indicating the latest (current) transmission direction, transmission weight, beam pattern of the SR device 500 at the transmission time point of the control state information. When the control state information received from the SR-UE 100B includes the beam state information, the gNB 200 (controller 230) can grasp the beam state in the SR device 500, based on the beam state information.

As illustrated in FIG. 16, when the SR-UE 100B controls a plurality of SR devices 500, the SR-UE 100B (transmitter 120) may transmit the control state information for each SR device 500 to the gNB 200. In this case, the control state information may include an identifier of the corresponding SR device 500 (SR device identifier). Note that the SR device identifier may be transmitted together with the control state information from the SR-UE 100B to the gNB 200 even when the SR-UE 100B controls only one SR device 500.

As described above, the SR-UE 100B (transmitter 120) transmits the SR device information indicating at least one of the capability of the SR device 500 and the control state of the SR device 500 to the gNB 200 through wireless communication. This enables the gNB 200 to grasp the capability and control state of the SR device 500.

(3) Operation Related to Measurement by SR-UE

Figure 17:
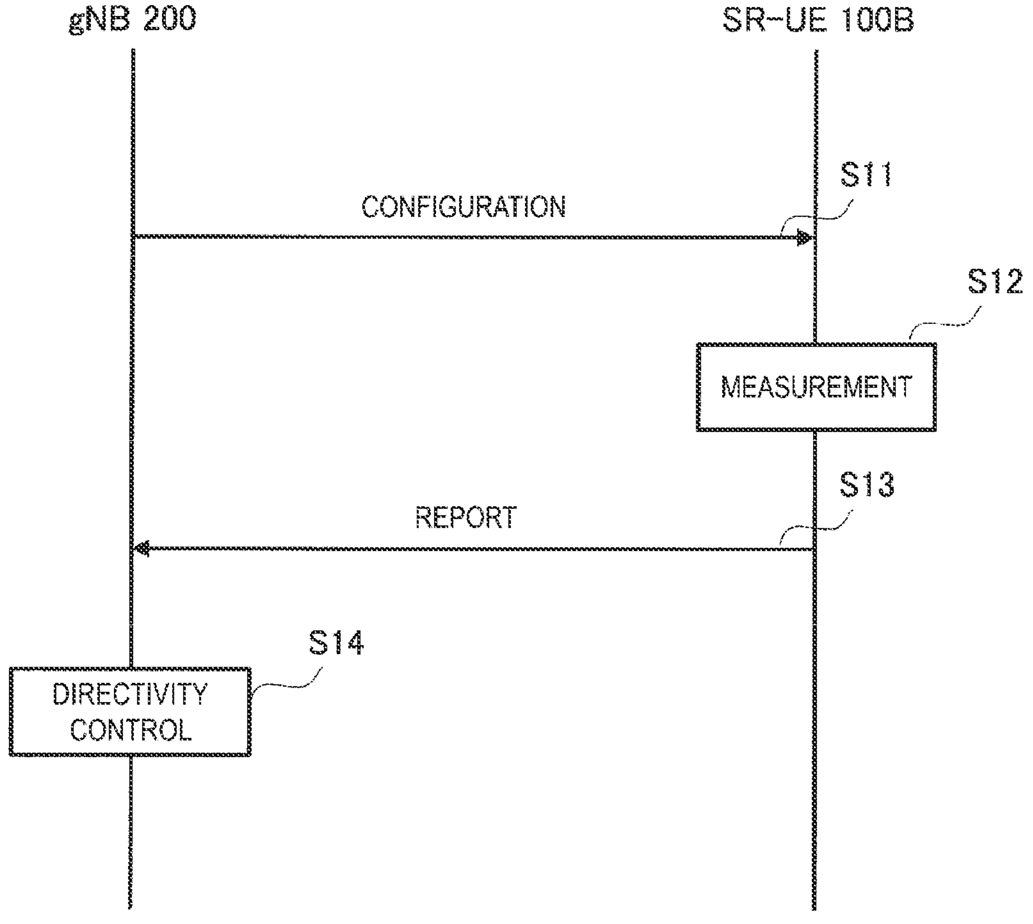
FIG. 17 is a diagram illustrating operations related to measurement by the SR-UE according to an embodiment.

FIG. 17 is a diagram illustrating operations related to measurement by the SR-UE 100B according to an embodiment. The SR-UE 100B measures a radio state. Here, it is assumed that the SR-UE 100B is integrated with the SR device 500 or located in the vicinity of the SR device 500. Therefore, a radio state in the SR-UE 100B can be treated to be equivalent to a radio state in the SR device 500.

As illustrated in FIG. 17, in step S11, the gNB 200 (transmitter 210) transmits a configuration related to measurement (measurement configuration) to the SR-UE 100B that has established a wireless connection to the gNB 200. In the measurement configuration, a measurement and a report of a measurement result for at least one of a radio wave received by the SR device 500 from the gNB 200 and a radio wave received by the SR device 500 from the UE 100 (for example, the UE 100A described above) are configured for the SR-UE 100B. The measurement configuration may include information to configure at least one selected from the group consisting of a measurement target frequency, a measurement target signal (for example, a DM-RS or a CSI-RS that is a downlink reference signal, and/or an SRS that is an uplink reference signal), a measurement target resource (for example, a subframe, a resource element, and/or a signal sequence), and a report type. The report type may be periodic report or event-triggered report.

In step S12, the SR-UE 100B (controller 130) performs measurement of the radio state (radio measurement) based on the measurement configuration received from the gNB 200 in step S11. The SR device 500 (controller 130) performs radio measurement on a radio wave received by the SR device 500 from the gNB 200 (in other words, downlink measurement). The SR device 500 (controller 130) may perform radio measurement on a radio wave received by the SR device 500 from the UE 100 (in other words, uplink measurement).

The measurement by the SR-UE 100B may be a radio resource management (RRM) measurement mainly performed in the RRC layer. The measurement by the SR-UE 100B may be a channel state information (CSI) measurement mainly performed in the PHY layer. The measurement result obtained by the RRM measurement may be, for example, at least one selected from the group consisting of a reference signal received power (RSRP), a reference signal received quality (RSRQ), and a received signal strength indicator (RSSI). The measurement result obtained by the CSI measurement may be, for example, at least one selected from the group consisting of a Channel Quality Indicator (CQI), a Precoding Matrix Indicator (PMI), a CSI-RS Resource Indicator (CRI), a Strongest layer Indicator (SLI), a Rank Indicator (RI), and an L1-RSRP.

In step S13, the SR-UE 100B (transmitter 120) transmits a report including the measurement result obtained in step S12 to the gNB 200. The measurement result is at least one of the RRM measurement result and the CSI measurement result.

In step S14, the gNB 200 (controller 230) controls transmission of a radio wave (for example, transmission directivity of a beam), based on the report of the measurement result received from the SR-UE 100B in step S13. For example, the gNB 200 (controller 230) controls the transmission directivity (and/or reception directivity) so that a beam is directed to the SR device 500. The gNB 200 (controller 230) may reconfigure the SR device 500 via an SR-UE 200B.

As described above, the gNB 200 (controller 230) treats the radio state in the SR-UE 100B to be equivalent to the radio state in the SR device 500, and thus can perform appropriate beamforming using the measurement result by the SR-UE 100B.

EXAMPLES

Given the embodiment described above, first to fifth examples are described. These examples can not only be separately and independently implemented, but can also be implemented in combination of two or more thereof. In an operation flow of each example described below, all the steps may not be necessarily performed, and only a part of the steps may be performed.

(1) First Example

Figure 18:
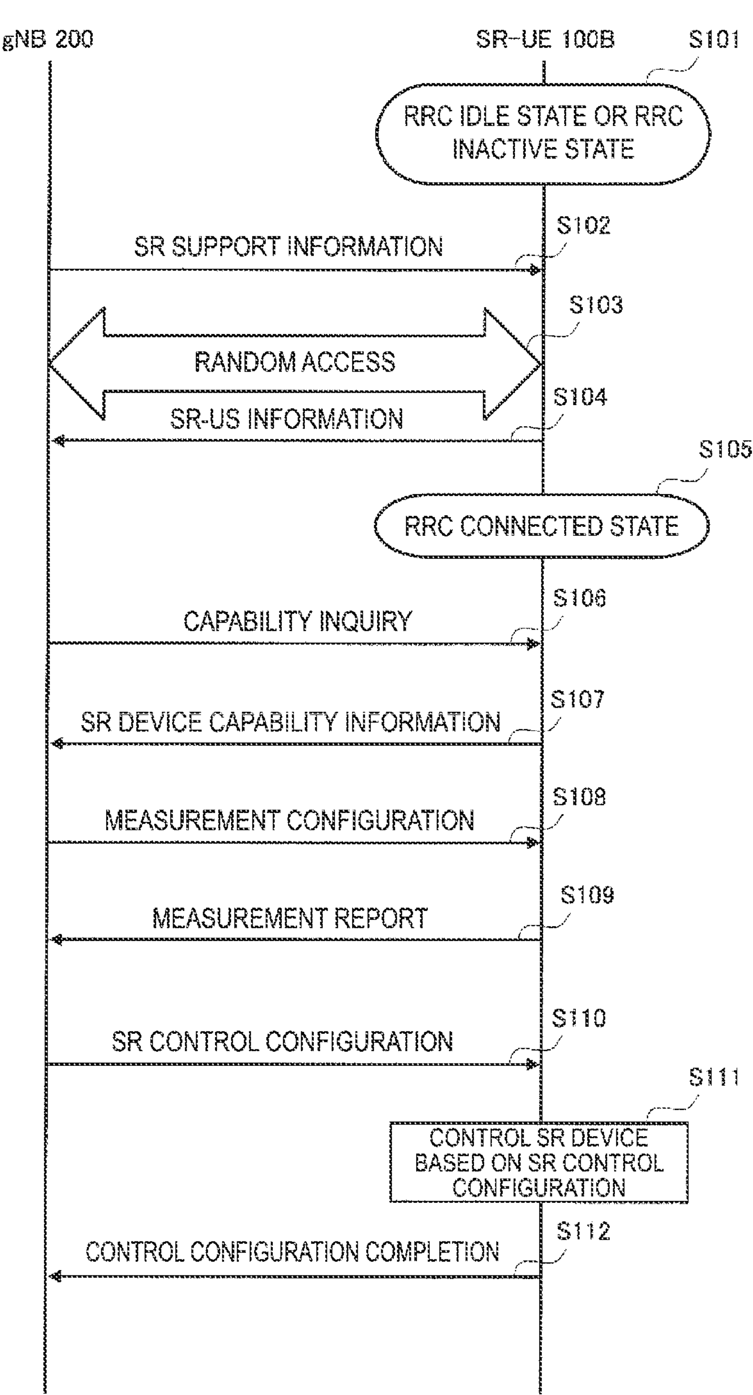
FIG. 18 is a diagram illustrating operations according to a first example.

FIG. 18 is a diagram illustrating operations according to a first example.

As illustrated in FIG. 18, in step S101 the SR-UE 100B is in an RRC idle state or an RRC inactive state.

In step S102, the gNB 200 (transmitter 210) broadcasts SR support information indicating that the gNB 200 supports the SR-UE 100B. For example, the gNB 200 (transmitter 210) broadcasts a system information block (SIB) including the SR support information. The SR support information may be information indicating that the SR-UE 100B is accessible. Alternatively, the gNB 200 (transmitter 210) may broadcast SR non-support information indicating that the gNB 200 does not support the SR-UE 100B. The non-SR support information may be information indicating that the SR-UE 100B is inaccessible.

The SR-UE 100B (controller 130) that has not established a wireless connection to the gNB 200 may determine that an access to the gNB 200 is permitted in response to receiving the SR support information from the gNB 200, and may perform an access operation to establish a wireless connection to the gNB 200. The SR-UE 100B (controller 130) may regard the gNB 200 (cell) to which an access is permitted as the highest priority and perform cell reselection.

On the other hand, when the gNB 200 does not broadcast the SR support information (or when the gNB 200 broadcasts the SR non-support information), the SR-UE 100B (controller 130) that has not established a wireless connection to the gNB 200 may determine that an access (connection establishment) to the gNB 200 is not possible. This allows the SR-UE 100B to establish a wireless connection only to the gNB 200 capable of handling the SR-UE 100B.

Note that when the gNB 200 is congested, the gNB 200 may broadcast access restriction information to restrict an access from the UE 100. However, unlike a normal UE 100, the SR-UE 100B can be regarded as a network-side entity. Therefore, the SR-UE 100B may ignore the access restriction information from the gNB 200. For example, the SR-UE 100B (controller 130), when receiving the SR support information from the gNB 200, may perform an operation to establish a wireless connection to the gNB 200 even if the gNB 200 broadcasts the access restriction information. For example, the SR-UE 100B (controller 130) may not perform (or may ignore) Unified Access Control (UAC). Alternatively, any one or both of Access Category/Access Identity (AC/AI) used in the UAC may be a special value indicating that the access is made by the SR-UE.

In step S103, the SR-UE 100B (controller 130) starts a random access procedure for the gNB 200. In the random access procedure, the SR-UE 100B (transmitter 120) transmits a random access preamble (Msg1) and an RRC message (Msg3) to the gNB 200. In the random access procedure, the SR-UE 100B (receiver 110) receives a random access response (Msg2) and an RRC message (Msg4) from the gNB 200.

In step S104, the SR-UE 100B (transmitter 120), when establishing a wireless connection to the gNB 200, may transmit SR-UE information indicating that the SR-UE 100B itself is an SR-UE to the gNB 200. For example, the SR-UE 100B (transmitter 120), during the random access procedure with the gNB 200, includes the SR-UE information in the message (for example, Msg1, Msg3, Msg5) for the random access procedure to transmit to the gNB 200. The gNB 200 (controller 230) can recognize that the accessing UE 100 is the SR-UE 100B, based on the SR-UE information received from the SR-UE 100B, and exclude from the access restriction target (in other words, accept the access from), for example, the SR-UE 100B.

In step S105, the SR-UE 100B transitions from the RRC idle state or the RRC inactive state to the RRC connected state.

In step S106, the gNB 200 (transmitter 120) transmits a capability inquiry message to inquire the capability of the SR-UE 100B to the SR-UE 100B. The SR-UE 100B (receiver 110) receives the capability inquiry message.

In step S107, the SR-UE 100B (transmitter 120) transmits a capability information message including the SR device capability information described above to the gNB 200. The gNB 200 (receiver 220) receives the capability information message. The gNB 200 (controller 230) grasps the capability of the SR device 500 based on the received capability information message.

In step S108, the gNB 200 (transmitter 210) transmits, to the SR-UE 100B, an RRC message including measurement configuration information to configure measurement by the SR-UE 100B (measurement configuration message). The SR-UE 100B (receiver 110) receives the measurement configuration message. The SR-UE 100B (controller 130) performs radio measurement based on the measurement configuration message.

In step S109, the SR-UE 100B (transmitter 120) transmits a report including a radio measurement result (measurement report) to the gNB 200. The gNB 200 (controller 230) may perform beamforming so that a beam is directed to the SR-UE 100B (SR device 500), based on the measurement report received from the SR-UE 100B. The gNB 200 (controller 230) may determine the SR control configuration to be configured for the SR-UE 100B, based on the measurement report received from the SR-UE 100B.

In step S110, the gNB 200 (transmitter 120) transmits the SR control configuration used to control the SR device 500 to the SR-UE 100B. The gNB 200 (transmitter 120) may transmit an RRC Reconfiguration message including the SR control configuration to the SR-UE 100B. The SR-UE 100B (receiver 110) receives the SR control configuration.

In step S111, the SR-UE 100B (controller 130) controls the SR device 500, based on the SR control configuration received from the gNB 200. The SR-UE 100B (controller 130) may control the SR device 500 by notifying the SR device 500 (SR controller 520) of the SR control configuration received from the gNB 200.

In step S112, the SR-UE 100B (transmitter 120) transmits a control configuration completion message (for example, an RRC Reconfiguration Complete message) to the gNB 200 upon completion of control (configuration change) of the SR device 500. Here, the SR-UE 100B (controller 130) may determine the control completion, based on a notification (feedback) from the SR device 500 (SR controller 520). The gNB 200 (receiver 220) receives the control configuration completion message.

(2) Second Example

Figure 19:
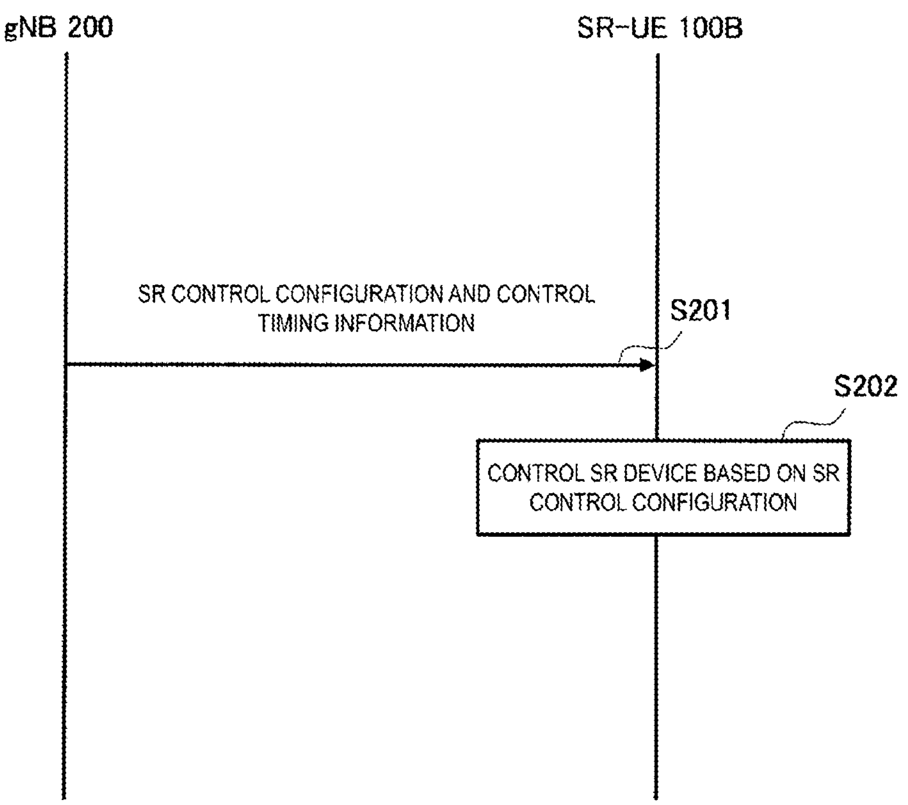
FIG. 19 is a diagram illustrating operations according to a second example.

In the embodiment and the first example described above, the case that the SR device 500 is semi-statically controlled is mainly assumed. In a second example, a case is assumed that the SR device 500 can be dynamically controlled. FIG. 19 is a diagram illustrating operations according to the second example.

As illustrated in FIG. 19, in step S201, the gNB 200 (transmitter 120) transmits, to the SR-UE 100B, one or more SR control configurations and control timing information indicating a timing at which each of the one or more SR control configurations is applied. For example, the gNB 200 (transmitter 120) transmits an RRC message including the SR control configuration and the control timing information (for example, an RRC Reconfiguration message) to the SR-UE 100B. The SR-UE 100B (receiver 110) receives the SR control configuration and the control timing information. Note that step S201 corresponds to step S110 in the first example described above.

In step S202, the SR-UE 100B (controller 130) controls the SR device 500, based on the SR control configuration and the control timing information received in step S201. To be more specific, the SR-UE 100B (controller 130) controls the SR device 500 in accordance with the SR control configuration associated with the control timing information at the timing indicated by the control timing information.

Figure 20:
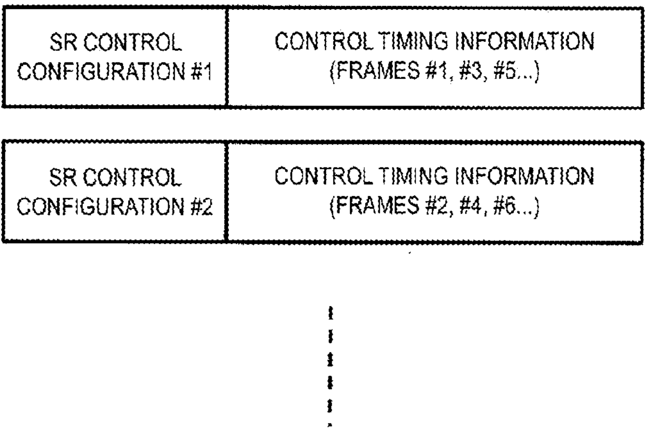
FIG. 20 is a diagram illustrating a configuration example of an SR control configuration and control timing information according to the second example.

FIG. 20 is a diagram illustrating a configuration example of the SR control configuration and the control timing information according to the second example.

As illustrated in FIG. 20, SR control configuration #1 and SR control configuration #2 are associated with respective pieces of control timing information different from each other. For example, the control timing information associated with SR control configuration #1 indicates that SR control configuration #1 is applied to frame numbers #1, #3, #5 . . . . The control timing information associated with SR control configuration #2 indicates that SR control configuration #2 is applied to frame numbers #2, #4, #6 . . . . Note that the SR-UE 100B (controller 130) can grasp the current frame number, based on the frame number broadcast by the gNB 200 (for example, the frame number in the master information block).

Here, the frame number may be a hyper system frame number (H-SFN), a system frame number (SFN), or a subframe number. The control timing information may include a slot number and/or an OFDM symbol number, and/or an absolute time (for example, a GPS time) instead of or in addition to the frame number. As described above, the plurality of SR control configurations are applied to the control of the SR device 500 at different timings. The control timing information includes information indicating an application timing of each of the plurality of SR control configurations.

FIG. 20 illustrates an example in which the application timing of the SR control configuration is designated by a frame number or the like. However, the control timing information may be configured in a bitmap format including bits each associated with a frame number. For example, the SR-UE 100B (controller 130) applies the SR control configuration in the frame number corresponding to "1" in the bitmap, and does not apply the SR control configuration in a radio frame corresponding to 0. The control timing information may further include a start frame number to which the bitmap is applied.

According to the second example, the SR device 500 can be dynamically controlled by transmitting from the gNB 200 to the SR-UE 100B, the control timing information indicating the timing at which the SR control configuration is applied.

For example, the gNB 200 can configure the beam direction and the amplification degree for each radio frame to the SR device 500 via the SR-UE 100B. The gNB 200 may configure a transmit PMI for each radio frame to the SxSR device 500 via the SR-UE 100B. For example, when the SR device 500 receives a signal by one antenna from the UE 100A and weights and transmits (relays) the signal by a plurality of antennas to the gNB 200, the transmit PMI can be controlled to be orthogonal to an uplink signal from another UE at a gNB reception antenna end.

(3) Third Example

Figure 21:
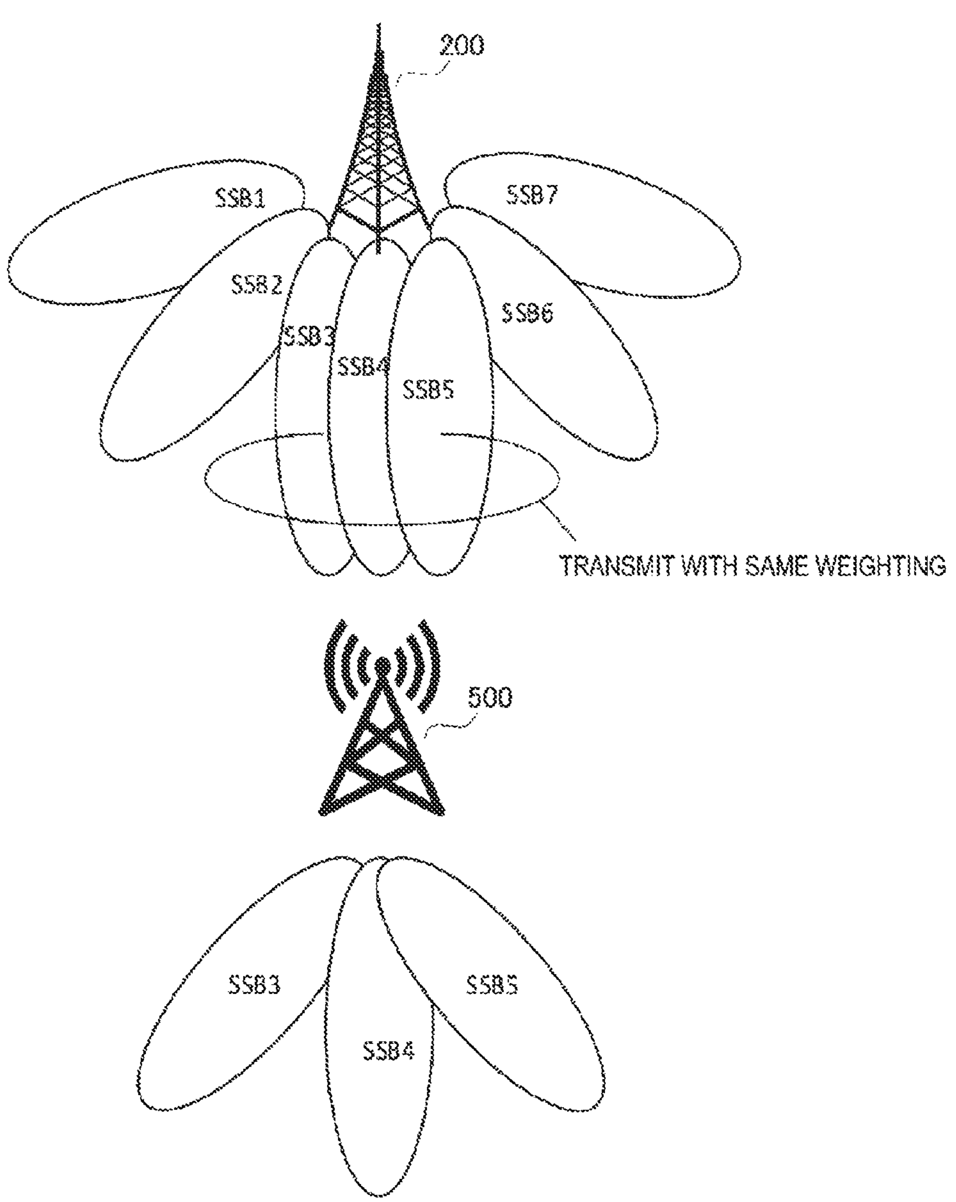
FIG. 21 is a diagram illustrating operations according to a third example.

In a third example, an example in which synchronization signal block (SS/PBCH Block: SSB) transmission is coordinated with the control of the SR device 500 is described. The SSB includes a primary synchronization signal (PSS), a secondary synchronization signal (SSS), a Physical Broadcast Channel (PBCH), and a demodulation reference signal (DMRS). For example, the SSB may include four OFDM symbols that are consecutive in the time domain. The SSB may include 240 subcarriers (20 resource blocks) that are consecutive in the frequency domain. Note that the PBCH is a physical channel that carries a master information block (MIB). FIG. 21 is a diagram illustrating operations according to the third example.

In the SSB transmission, the gNB 200 performs beam sweeping by changing weighting (directivity) for each SSB. When the SR device 500, to be more specific, the SR 510 is interposed in the propagation path between the gNB 200 and UE 100, the communication quality changes under the control of the SR device 500. Therefore, the beam sweeping in coordination with the control of the SR device 500 makes it possible to optimize the SSB transmission in which the SR device 500 is interposed.

As illustrated in FIG. 21, the gNB 200 (transmitter 210) transmits a plurality of SSBs at timings different from each other and with beams different from each other. FIG. 21 illustrates an example in which the gNB 200 (transmitter 210) transmits a total of seven SSBs from an SSB1 to an SSB7. Here, the gNB 200 (transmitter 210) transmits a configuration of the SSB3 to the SSB5 (hereinafter referred to as "SSB set") with the same weighting (in other words, the same beam characteristics). Although an example is illustrated in which the number of SSBs constituting the SSB set is three, the number of SSBs constituting the SSB set may be two, or four or more.

The gNB 200 (transmitter 210) may transmit information relating to each SSB included in the SSB set (for example, information of an identifier and/or a transmission timing of the SSB) to the SR-UE 100B by way of an RRC message, for example. The gNB 200 (transmitter 210) may transmit the SR control configuration in association with the information relating to each SSB included in the SSB set to the SR-UE 100B. In other words, the gNB 200 (transmitter 210) may transmit the SR control configuration for each SSB included in the SSB set to the SR-UE 100B. The gNB 200 (transmitter 210) may designate a different application timing for each SR control configuration using the control timing information described above. The control timing information for SSB may include information elements the same as or different from those of the control timing information described above.

The SR-UE 100B applies a different SR control configuration for each SSB included in the SSB set to control the SR device 500. FIG. 21 illustrates an example in which the SR device 500 transmits SSB 3 to SSB 5 included in the SSB set in mutually different directions. Here, the transmission directions of the SSBs from the SR device 500 are coordinated with original transmission directions of the SSBs transmitted by the gNB 200.

As described above, in the third example, the gNB 200 transmits a plurality of SSBs (SSB sets) with transmission timings different from each other toward the SR device 500. The SR control configurations are associated with the plurality of SSBs. To be more specific, the gNB 200 transmits the plurality of SSBs with the same beam characteristics toward the SR device 500. The SR-UE 100B controls the transmission direction of the radio wave for the SR device 500 to perform directional transmission for each of the plurality of SSBs based on the SR control configurations. This can make the transmission direction different for each SSB included in the SSB set.

In the example described in the third example, the SR-UE 100B controls the SR device 500 in accordance with the SR control configuration from the gNB 200. However, the SR-UE 100B may autonomously control the SR device 500 in accordance with a preconfigured SR control configuration even if the SR control configuration is not configured from the gNB 200. In this case, the SR-UE 100B may notify the gNB 200 of the preconfigured SR control configuration as the control state information descried above. Details of such an operation are described in a fourth example below.

(4) Fourth Example

Figure 22:
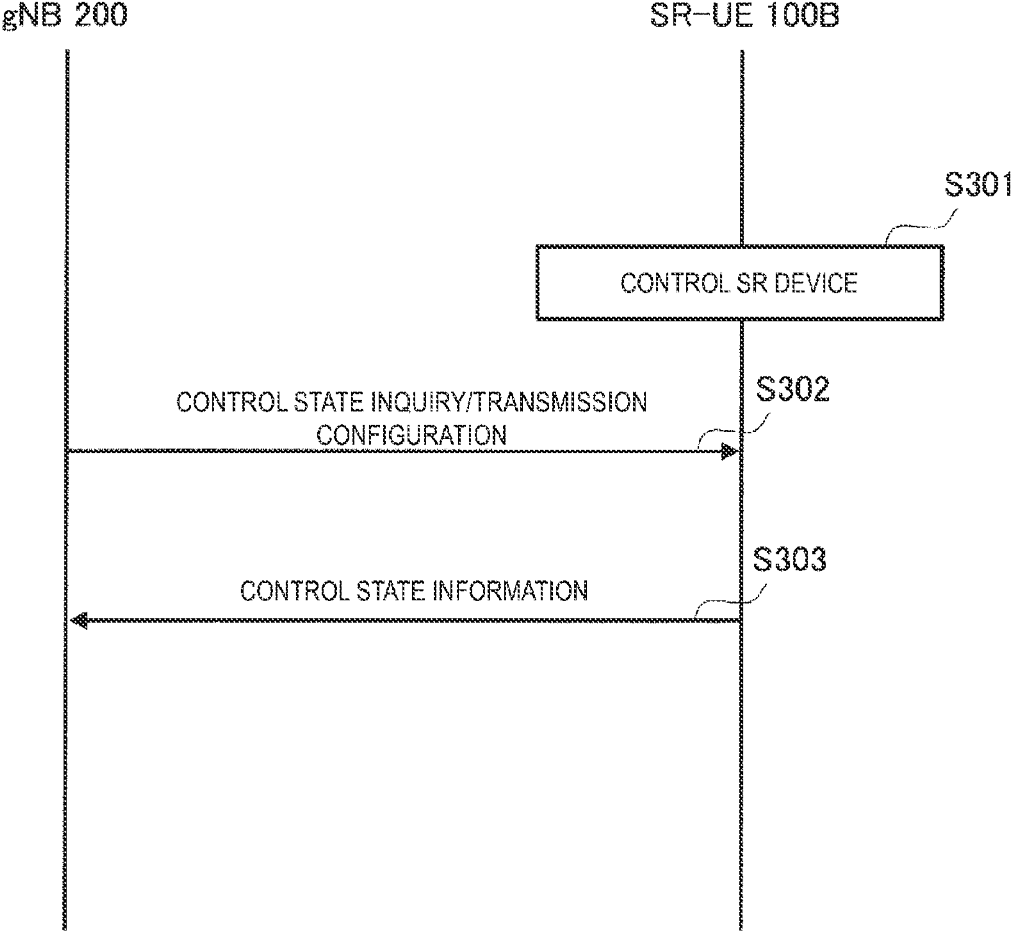
FIG. 22 is a diagram illustrating operations according to a fourth example.

In a fourth example, an example in which the SR-UE 100B autonomously controls the SR device 500 and notifies the gNB 200 of the current control state is described. The SR-UE 100B may autonomously control the SR device 500, based on auxiliary information from the gNB 200. FIG. 22 is a diagram illustrating operations according to the fourth example.

As illustrated in FIG. 22, in step S301, the SR-UE 100B (controller 130) autonomously controls the SR device 500.

In step S302, the gNB 200 (transmitter 210) transmits, to the SR-UE 100B, a control state inquiry to inquire of the UE 100 about the control state information described above or a control state transmission configuration to configure the control state information transmission described above for the UE 100. The gNB 200 (transmitter 210) may transmit an RRC message including the control state inquiry or the control state transmission configuration to the SR-UE 100B. The control state transmission configuration may include information to configure a period with which the control state information is transmitted from the SR-UE 100B to the gNB 200, or information to configure a trigger event in which the control state information is transmitted from the SR-UE 100B to the gNB 200 (for example, an event that the radio state (RSRP or the like) of the SR-UE 100B exceeds a threshold, or an event that the radio state of the SR-UE 100B falls below a threshold).

In step S303, the SR-UE 100B (transmitter 120) transmits the control state information to the gNB 200, based on the control state inquiry or the control state transmission configuration received from the gNB 200. The gNB 200 (controller 130) the SR-UE 100B (transmitter 120) grasps the current control state in the SR-UE 100B (SR device 500) based on the control state information received from the gNB 200.

According to the fourth example, even when the SR-UE 100B autonomously controls the SR device 500, the gNB 200 can grasp the current control state.

(5) Fifth Example

Figure 23:
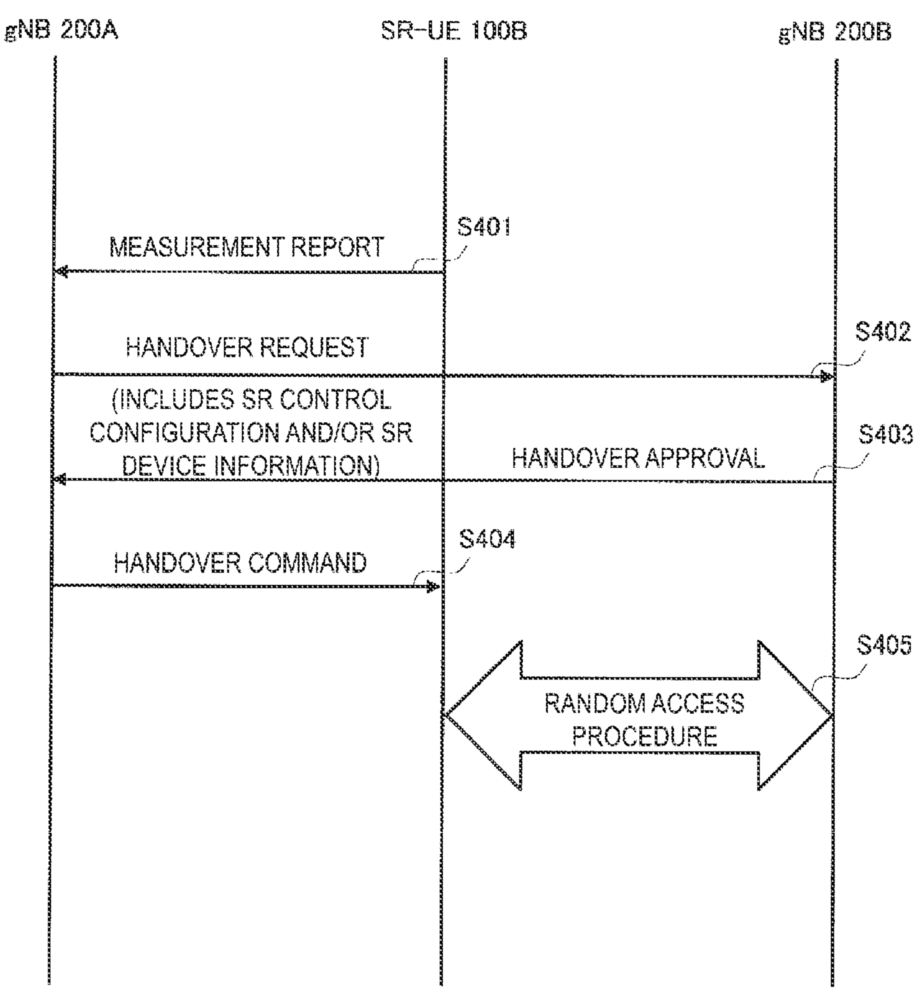
FIG. 23 is a diagram illustrating operations according to a fifth example.

In a fifth example, an example is described in which the SR-UE 100B performs handover between the gNBs 200. FIG. 23 is a diagram illustrating operations according to the fifth example.

As illustrated in FIG. 23, in step S401, the SR-UE 100B (controller 130) transmits a measurement report to a gNB 200A. The gNB 200A (controller 230) determines handover of the SR-UE 100B to the gNB 200B, based on the measurement report received from the SR-UE 100B.

In step S402, the gNB 200A (backhaul communicator 240) transmits, to the gNB 200B, a handover request message to request the handover of the SR-UE 100B. Here, the gNB 200A (backhaul communicator 240) may include in the handover request message the SR control configuration configured for the SR-UE 100B by the gNB 200A to transmit to the gNB 200B. The gNB 200A (backhaul communicator 240) may include in the handover request message the SR device information received from the SR-UE 100B by the gNB 200A to transmit to the gNB 200B.

The gNB 200B (controller 230) determines whether to approve the handover of the SR-UE 100B based on the handover request received from the gNB 200A. Here, the description continues on the assumption that the handover is determined to be approved.

In step S403, the gNB 200B (backhaul communicator 240) transmits a handover approval message to the gNB 200A. The gNB 200B (backhaul communicator 240) may include in the handover approval message the SR control configuration to be configured for the SR-UE 100B after the handover to transmit to the gNB 200A.

In step S404, the gNB 200A (transmitter 210) transmits, to the SR-UE 100B, a handover command to indicate the handover to the gNB 200B. The gNB 200A (transmitter 210) may include the SR control configuration received from the gNB 200B in the handover command to transmit to the SR-UE 100B.

In step S405, the SR-UE 100B (controller 130) establishes a wireless connection to the gNB 200B by performing a random access procedure with the gNB 200B in response to receiving the handover command After the handover, the SR-UE 100B (controller 130) may control the SR device 500, based on the SR control configuration included in the handover command.

According to the fifth example, even when the SR-UE 100B performs handover between the gNBs 200, the handover of the SR-UE 100B can be appropriately controlled.

Other Embodiments

The SR-UE 100B preferably maintains the RRC connected state once connected to the gNB 200 or when SR control is performed from the gNB 200. When the SR-UE 100B transitions to the RRC inactive state or the RRC idle state (or when the power of the SR-UE 100B is turned on), the SR-UE 100B may control the SR device 500 in the omni mode or to have a characteristic as close as possible to the omni mode. This can reduce adverse effects such as the SR device 500 that is not controlled from the gNB 200 unintentionally narrowing the existing coverage area.

The operation flows described above can be separately and independently implemented, and also be implemented in combination of two or more of the operation flows. For example, some steps of one operation flow may be added to another operation flow or some steps of one operation flow may be replaced with some steps of another operation flow.

In the embodiment described above, an example in which the base station is an NR base station (i.e., a gNB) is described; however, the base station may be an LTE base station (i.e., an eNB). The base station may be a relay node such as an Integrated Access and Backhaul (IAB) node. The base station may be a Distributed Unit (DU) of the IAB node.

A program causing a computer to execute each of the processes performed by the UE 100 (SR-UE 100B) or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing each of the processes performed by the UE 100 (SR-UE 100B) or the gNB 200 may be integrated, and at least part of the UE 100 (SR-UE 100B) or the gNB 200 may be configured as a semiconductor integrated circuit (a chipset or a System on a Chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

REFERENCE SIGNS

1: Mobile communication system
100: UE
100B: SR-UE
110: Receiver
120: Transmitter
130: Controller
140: Interface
200: gNB
210: Transmitter
220: Receiver
230: Controller
240: Backhaul communicator
500: SR device
510: Wireless unit
510*a*: Antenna unit
510*b*: RF circuit
510*c*: Directivity controller
520: SR controller

The invention claimed is:

1. A communication control method comprising:

establishing, by a repeater control wireless terminal, a wireless connection to a network node, the repeater control wireless terminal being configured to control a network controlled repeater configured to relay wireless communication between the network node and a wireless terminal; and transmitting, by the network node to the repeater control wireless terminal through wireless communication, control timing information including a plurality of repeater control configurations applied to control the network controlled repeater at timings different from one another, wherein the transmitting comprises transmitting, to the repeater control wireless terminal, the control timing information indicating an application a timing at which each of the plurality of repeater control configurations is applied.

2. The communication control method according to claim 1, wherein the wireless connection is a radio resource control (RRC) connection.

3. The communication control method according to claim 1, wherein the control timing information comprises information for activating relay transmission by the network controlled repeater.

4. The communication control method according to claim 1, wherein each of the plurality of repeater control configurations comprises beam configuration information to configure a transmission direction, a transmission weight, or a beam pattern for when the network controlled repeater performs directional transmission.

5. The communication control method according to claim 1, further comprising:

broadcasting, by the network node, support information indicating that the network node supports the repeater control wireless terminal; and performing, by the repeater control wireless terminal not having established the wireless connection to the network node, an operation to establish the wireless connection to the network node in response to reception of the support information from the network node.

6. The communication control method according to claim 1, further comprising:

the plurality of repeater control configurations comprise repeater control configurations respectively associated with a plurality of synchronization signal blocks transmitted by the network node.

7. The communication control method according to claim 1, wherein the transmitting of the plurality of repeater control configurations comprises transmitting, to the repeater control wireless terminal, a Medium Access Control (MAC) Control Element (CE) comprising the plurality of repeater control configurations.

8. The communication control method according to claim 1, wherein the transmitting of the plurality of repeater control configurations comprises transmitting, as an information element, an RRC message comprising the plurality of repeater control configurations to the repeater control wireless terminal.

9. A wireless terminal for performing wireless communication with a network node in a mobile communication system, the wireless terminal comprising:

a receiver configured to receive, from a network node through wireless communication, control timing information including a plurality of repeater control configurations applied to control a network controlled repeater at timings different from one another, the network controlled repeater configured to relay wireless communication between the network node and another wireless terminal; and a circuitry configured to control the network controlled repeater based on the plurality of repeater control configurations, wherein the receiver is configured to receive, from the network node, the control timing information indicating an application a timing at which each of the plurality of repeater control configurations is applied.

10. A network node for performing wireless communication with a wireless terminal in a mobile communication system, the network node comprising:

a transmitter configured to transmit, to a wireless terminal through wireless communication, control timing information including a plurality of repeater control configurations applied to control a network controlled repeater at timings different from one another, the wireless terminal being configured to control the network controlled repeater configured to relay wireless communication between the network node and another wireless terminal, wherein the transmitter is configured to transmit, to the wireless terminal, the control timing information indicating an application timing at which each of the plurality of repeater control configurations is applied.

11. A chipset for a wireless terminal for performing wireless communication with a network node in a mobile communication system, the chipset configured to execute processing of:

receiving, from a network node through wireless communication, control timing information including a plurality of repeater control configurations applied to control a network controlled repeater at timings different from one another, the network controlled repeater configured to relay wireless communication between the network node and another wireless terminal;

controlling the network controlled repeater based on the plurality of repeater control configurations; and receiving, from the network node, the control timing information indicating an application timing at which each of the plurality of repeater control configurations is applied.

12. A mobile communication system comprising:

a network node; and a repeater control wireless terminal configured to control a network controlled repeater configured to relay wireless communication between the network node and a wireless terminal, wherein the repeater control wireless terminal is configured to establish a wireless connection to the network node, and the network node is configured to:

transmit, to the repeater control wireless terminal through wireless communication, control timing information including a plurality of repeater control configurations applied to control the network controlled repeater at timings different from one another, and transmit, to the repeater control wireless terminal, the control timing information indicating an application timing at which each of the plurality of repeater control configurations is applied.

13. A non-transitory computer-readable medium comprising, stored thereupon, computer program instructions for execution by a wireless terminal for performing wireless communication with a network node in a mobile communication system, the computer program instructions being configured to cause the wireless terminal to execute processing of:

receiving, from a network node through wireless communication, control timing information including a plurality of repeater control configurations applied to control a network controlled repeater at timings different from one another, the network controlled repeater configured to relay wireless communication between the network node and another wireless terminal;

controlling the network controlled repeater based on the plurality of repeater control configurations; and receiving, from the network node, the control timing information indicating an application timing at which each of the plurality of repeater control configurations is applied.

* * * * *